United States Patent
Toyoda et al.

(10) Patent No.: US 10,571,786 B2
(45) Date of Patent: Feb. 25, 2020

(54) PROJECTION SYSTEM AND PROJECTION-TYPE IMAGE DISPLAY APPARATUS

(71) Applicant: SEIKO EPSON CORPORATION, Tokyo (JP)

(72) Inventors: Shoichiro Toyoda, Shiojiri (JP); Koji Shiokawa, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/119,422

(22) Filed: Aug. 31, 2018

(65) Prior Publication Data
US 2019/0072838 A1   Mar. 7, 2019

(30) Foreign Application Priority Data
Sep. 4, 2017  (JP) .................. 2017-169219

(51) Int. Cl.
| | |
|---|---|
| *G03B 21/14* | (2006.01) |
| *G02B 27/09* | (2006.01) |
| *G02B 15/15* | (2006.01) |
| *G02B 15/177* | (2006.01) |
| *G02B 13/16* | (2006.01) |

(52) U.S. Cl.
CPC .......... *G03B 21/142* (2013.01); *G02B 13/16* (2013.01); *G02B 15/155* (2013.01); *G02B 15/177* (2013.01); *G02B 27/0955* (2013.01)

(58) Field of Classification Search
CPC .... G03B 21/142; G02B 13/16; G02B 15/155; G02B 15/177; G02B 27/0955
USPC ....................................... 353/101
See application file for complete search history.

(56) References Cited

U.S. PATENT DOCUMENTS

| | | | |
|---|---|---|---|
| 6,710,932 B2 | 3/2004 | Kitaoka et al. | |
| 7,646,543 B2 | 1/2010 | Webb | |
| 2003/0137746 A1 | 7/2003 | Kitaoka et al. | |
| 2009/0231724 A1 | 9/2009 | Webb | |
| 2017/0235089 A1 | 8/2017 | Hanaoka et al. | |

(Continued)

FOREIGN PATENT DOCUMENTS

| | | |
|---|---|---|
| JP | H08-005921 A | 1/1996 |
| JP | 2003-248171 A | 9/2003 |
| JP | 2014-30044 A | 2/2014 |

(Continued)

*Primary Examiner* — Jerry L Brooks
(74) *Attorney, Agent, or Firm* — Oliff PLC

(57) ABSTRACT

A projection system includes a first lens group that does not move when the projection magnification is changed with the aid of the zoom function, and the first lens group includes a correction lens group that is moved in the direction of the optical axis to correct worsened astigmatism. The projection system satisfies the following conditional expressions (1) and (2):

$$|\Delta BF20| < P \times FNO \times \sqrt{2} \quad (1)$$

$$1.5 < |f1/f| \quad (2)$$

where P represents the pixel pitch in an image displayed by liquid crystal panels, FNO represents the F number of the entire lens system, $\Delta BF$ represents the amount of movement of the back focus position in a case where the correction lens group is moved by the amount of movement for correction of the aberration that changes when the temperature changes by 20° C., f represents the focal length of the entire lens system, and f1 represents the focal length of the correction lens group.

9 Claims, 16 Drawing Sheets

(56) References Cited

U.S. PATENT DOCUMENTS

2019/0250382 A1* 8/2019 Lee ................ G02B 7/021

FOREIGN PATENT DOCUMENTS

| JP | 2015-49340 A | 3/2015 |
| JP | 2015-87535 A | 5/2015 |
| JP | 2016-80823 A | 5/2016 |

* cited by examiner

| SURFACE NUMBER | LENS NUMBER | LENS GROUP | RADIUS OF CURVATURE | THICKNESS / GAP | nd | $\nu$d |
|---|---|---|---|---|---|---|
| Screen | | | INFINITY | OBJ | | |
| 1 (ASPHERIC SURFACE) | L1 | FIRST GROUP / CORRECTION LENS GROUP | 216.922 | 5.040 | 1.509415 | 55.9 |
| 2 (ASPHERIC SURFACE) | | | 128.975 | A | | |
| 3 | L2 | FIRST GROUP / FIXED LENS GROUP | 71.223 | 3.240 | 1.497 | 81.5 |
| 4 | | | 49.262 | 29.173 | | |
| 5 | L3 | | -85.822 | 3.200 | 1.497 | 81.5 |
| 6 | | | 604.320 | B | | |
| 7 | L4/L5 DOUBLET | SECOND GROUP | -73.392 | 10.180 | 1.83481 | 42.7 |
| 8 | | | -58.837 | 2.800 | 1.80518 | 25.4 |
| 9 | | | -78.238 | 3.110 | | |
| 10 | L6 | | 294.236 | 7.4 | 1.84666 | 23.8 |
| 11 | | | -314.793 | C | | |
| 12 | L7 | THIRD GROUP | 97.512 | 7.430 | 1.83481 | 42.7 |
| 13 | | | 400.920 | D | | |
| 14 | L8 | FOURTH GROUP | 6648.660 | 2.2 | 1.60342 | 38.0 |
| 15 | | | 58.823 | 2.131 | | |
| 16 | L9 | | 62.862 | 11.021 | 1.497 | 81.5 |
| 17 | | | 158.200 | E | | |
| 18 | L10 | FIFTH GROUP | 74.040 | 12.740 | 1.43875 | 94.9 |
| 19 | | | -121.240 | 15.750 | | |
| 20 | L11 | | -192.863 | 2.100 | 1.84666 | 23.8 |
| 21 | | | 68.466 | 2.35 | | |
| 22 | L12 | | 76.491 | 9.270 | 1.43875 | 94.9 |
| 23 | | | -219.074 | F | | |
| 24 | L13/L14 DOUBLET | SIXTH GROUP | -46.885 | 2.600 | 1.80518 | 25.4 |
| 25 | | | 236.696 | 18.040 | 1.497 | 81.5 |
| 26 | | | -63.672 | 0.200 | | |
| 27 | L15 | | 1307.285 | 10.670 | 1.92286 | 20.9 |
| 28 | | | -117.477 | G | | |
| 29 | L16 | SEVENTH GROUP | 178.910 | 7.76 | 1.80809 | 22.8 |
| 30 | | | -2574.640 | 10.000 | | |
| 31 | | | INFINITY | 60.000 | 1.5168 | 64.2 |
| Panel | | | INFINITY | | | |

FIG. 4

| SURFACE NUMBER | LENS NUMBER | LENS GROUP | RADIUS OF CURVATURE | THICKNESS / GAP | nd | νd |
|---|---|---|---|---|---|---|
| Screen | | | INFINITY | OBJ | | |
| 1 | L1 | FIRST GROUP / CORRECTION LENS GROUP | 268.300 | 7.260 | 1.51633 | 64.1 |
| 2 | | | 562.270 | 0.240 | | |
| 3 (ASPHERIC SURFACE) | L2 | | 84.350 | 4.000 | 1.53116 | 56.0 |
| 4 (ASPHERIC SURFACE) | | | 57.275 | A | | |
| 5 | L3 | FIRST GROUP / FIXED LENS GROUP | 77.418 | 3.200 | 1.84666 | 23.8 |
| 6 | | | 40.105 | 21.224 | | |
| 7 | L4 | | -806.100 | 2.800 | 1.61800 | 63.4 |
| 8 | | | 68.960 | 15.599 | | |
| 9 | L5 | | -73.619 | 2.560 | 1.43700 | 95.1 |
| 10 | | | 194.360 | 7.47 | | |
| 11 | L6 | SECOND GROUP | -268.600 | 3.568 | 1.84666 | 23.8 |
| 12 | | | -164.307 | 0.800 | | |
| 13 | L7 | | 125.394 | 15.555 | 1.60342 | 38.0 |
| 14 | | | -123.068 | B | | |
| 15 | L8 | THIRD GROUP | 96.256 | 6.565 | 1.69895 | 30.1 |
| 16 | | | 298.836 | C | | |
| 17 | L9 | FOURTH GROUP | 84.381 | 5.410 | 1.48749 | 70.2 |
| 18 | | | -1574.660 | 7.402 | | |
| 19 | L10 | | 75.024 | 1.600 | 1.49700 | 81.5 |
| 20 | | | 45.762 | D | | |
| 21 | L11 | FIFTH GROUP | -48.752 | 2.080 | 1.90366 | 31.3 |
| 22 | | | 392.069 | 0.363 | | |
| 23 | L12 | | 152.091 | 10.060 | 1.80610 | 33.3 |
| 24 | | | -63.784 | 0.240 | | |
| 25 | L13 | | 885.769 | 10.280 | 1.49700 | 81.5 |
| 26 | | | -45.339 | 1.978 | | |
| 27 | L14 | | -41.165 | 1.600 | 1.80610 | 33.3 |
| 28 | | | -70.389 | E | | |
| 29 | L15 | SIXTH GROUP | 140.915 | 11.915 | 1.43700 | 95.1 |
| 30 | | | -55.187 | 0.160 | | |
| 31 | L16 | | -64.148 | 2.240 | 1.80610 | 33.3 |
| 32 | | | 75.606 | 1.493 | | |
| 33 | L17 | | 83.830 | 11.163 | 1.43700 | 95.1 |
| 34 | | | -98.687 | F | | |
| 35 | L18 | SEVENTH GROUP | 212.541 | 7.430 | 1.80809 | 22.8 |
| 36 | | | -195.853 | 8.000 | | |
| 37 | | | INFINITY | 65.000 | 1.5168 | 64.2 |
| Panel | | | INFINITY | 20.13 | | |

FIG. 9

| SURFACE NUMBER | LENS NUMBER | LENS GROUP | RADIUS OF CURVATURE | THICKNESS / GAP | nd | νd |
|---|---|---|---|---|---|---|
| Screen | | | INFINITY | OBJ | | |
| 1 (ASPHERIC SURFACE) | L1 | FIRST GROUP / CORRECTION LENS GROUP | −52.187 | 4.500 | 1.50942 | 55.9 |
| 2 (ASPHERIC SURFACE) | | | −47.248 | 2.800 | | |
| 3 | L2 | | 434.180 | 1.600 | 1.49700 | 81.5 |
| 4 | | | 21.399 | A | | |
| 5 | L3 | FIRST GROUP / FIXED LENS GROUP | −28.680 | 1.600 | 1.49700 | 81.5 |
| 6 | | | 76.456 | B | | |
| 7 | L4/L5 DOUBLET | SECOND GROUP | 71.750 | 12.600 | 1.83481 | 42.7 |
| 8 | | | −25.130 | 1.800 | 1.85025 | 30.1 |
| 9 | | | −68.315 | 0.200 | | |
| 10 | L6 | | 46.170 | 3.28 | 1.92286 | 20.9 |
| 11 | | | 89.745 | C | | |
| 12 | L7/L8 DOUBLET | THIRD GROUP | 47.971 | 5.120 | 1.62299 | 58.2 |
| 13 | | | −74.396 | 1.100 | 1.72825 | 28.5 |
| 14 | | | −529.789 | D | | |
| 15 | L9 | FOURTH GROUP | −31.341 | 0.900 | 1.78472 | 25.68 |
| 16 | | | 41.492 | E | | |
| 17 (ASPHERIC SURFACE) | L10 | FIFTH GROUP | 68.259 | 5.88 | 1.58913 | 61.2 |
| 18 (ASPHERIC SURFACE) | | | −24.277 | F | | |
| 19 | L11/L12 DOUBLET | SIXTH GROUP | −29.323 | 1.200 | 1.80610 | 33.3 |
| 20 | | | 35.511 | 6.020 | 1.49700 | 81.5 |
| 21 | | | −62.343 | 0.183 | | |
| 22 | L13 | | 96.834 | 7.180 | 1.59522 | 67.7 |
| 23 | | | −32.531 | G | | |
| 24 | L14 | SEVENTH GROUP | 91.400 | 4.080 | 1.92286 | 20.9 |
| 25 | | | −148.989 | 5.000 | | |
| 26 | | | INFINITY | 31.000 | 1.51633 | 64.14 |
| Panel | | | INFINITY | 4.38 | | |

FIG.14

PROJECTION SYSTEM AND PROJECTION-TYPE IMAGE DISPLAY APPARATUS

BACKGROUND

1. Technical Field

The present invention relates to a projection system that readily allows correction of aberrations produced due to a temperature change and a projection-type image display apparatus including the projection system.

2. Related Art

In a projection-type image display apparatus, such as a projector, the density of light rays that pass through a projection system increases as the luminance of light outputted from the apparatus increases. The temperature of a lens that forms the projection system therefore increases when an image is projected, resulting in a change in optical characteristics of the projection system in some cases.

JP-A-2016-80823 discloses a technology for correcting a change in the optical characteristics due to a temperature change by moving at least two lens groups out of a plurality of lens groups that form the projection system in the optical axis direction. One of the two lens groups, which is moved in the optical axis direction, corrects field curvature of a projected image degraded due to the temperature change. The other lens group, which is moved in the optical axis direction, corrects a back focus position of the projection system that changes due to the temperature change.

In the case where the temperature of a lens that forms the projection system increases when an image is projected, astigmatism, among the optical characteristics of the projection system, worsens in some cases.

SUMMARY

An advantage of some aspects of the invention is to provide a projection system that allows correction of astigmatism having worsened due to a temperature change and a projection-type image display apparatus in which the projection system is incorporated.

An aspect of the invention is directed to a projection system that projects an image displayed on an image display device and having a predetermined pixel pitch on a screen and has a zoom function of changing projection magnification, the projection system including a first lens group that is located in a position closest to the screen in the projection system and does not move in a direction of an optical axis when the projection magnification is changed with an aid of the zoom function. The first lens group includes a correction lens group that is moved in the direction of the optical axis to correct a change in an aberration produced due to a temperature change and a fixed lens group that is disposed on a side opposite the screen with respect to the correction lens group and does not move in the direction of the optical axis. The correction lens group is formed of one or more lenses arranged from a side facing the screen. The following conditional expressions (1) and (2) are satisfied:

$$|\Delta BF20| < P \times FNO \times \sqrt{2} \quad (1)$$

$$1.5 < |f1/f| \quad (2)$$

where P represents the pixel pitch in the image, FNO represents an F number of an entire lens system, f represents a focal length of the entire lens system, f1 represents a focal length of the correction lens group, and ΔBF represents an amount of movement of a back focus position in a case where the correction lens group is moved by an amount of movement for correction of the aberration that changes when the temperature changes by 20° C.

In the aspect of the invention, the correction lens group, which is located in a position closest to the screen in the projection system, is moved to correct degradation in optical characteristics of the projection system. Worsened astigmatism is therefore readily corrected. Further, since the focal length of the correction lens group and the focal length of the entire lens system satisfy the conditional expression (2), the astigmatism is readily corrected by moving the correction lens group to the direction of the optical axis.

The conditional expression (1) shows that the amount of movement of the back focus position is smaller than the depth of focus of the projection system when the correction lens group is moved by the amount of movement for correction of the astigmatism that worsens (changes) when the temperature changes by 20° C. Therefore, in the aspect of the invention, which satisfies the conditional expression (1), the amount of movement of the back focus position in the case where the correction lens group is moved by the amount of movement for correction of the astigmatism that changes when the temperature changes by 20° C. is small enough not to affect the quality of a projected image. A change in the back focus position of the projection system that occurs due to a temperature change can be suppressed in a design phase. Therefore, as long as the amount of movement of the back focus position in the case where the correction lens group is moved is smaller than the depth of focus of the projection system, it is unnecessary to provide, separately from the correction lens group, a second correction lens group for correcting the back focus position. The number of lens groups to be moved in the direction of the optical axis to correct astigmatism that worsens due to a temperature change can therefore be reduced.

In the aspect of the invention, it is desirable that a fixed-lens-group first lens located in a position closest to the screen in the fixed lens group is a negative lens, and that a following expression (3) is satisfied:

$$0.1 < |f2/f1| < 0.9 \quad (3)$$

where f2 represents a focal length of the fixed-lens-group first lens.

In a case where |f2/f1| is greater than the upper limit or smaller than the lower limit in the conditional expression (3), the amount of distortion increases in some cases when the correction lens group is moved to correct astigmatism produced due to a temperature change. On the other hand, in the case where the focal length f2 of the fixed-lens-group first lens, which is a negative lens, and the focal length f1 of the correction lens group satisfy the conditional expression (3), the increase in the distortion can be suppressed. Further, when the conditional expression (3) is satisfied, an increase in field curvature can be suppressed.

In the aspect of the invention, it is desirable that in a case where the correction lens group is formed of one lens, following conditional expressions (4) and (5) are satisfied:

$$1.45 < nd1 < 1.60 \quad (4)$$

$$50 < vd1 < 85 \quad (5)$$

where nd1 represents a refractive index of the lens and vd1 represents an Abbe number of the lens, and in a case where the correction lens group is formed of a plurality of lenses, the following conditional expressions (4) and (5) are satisfied:

$$1.45 < nd1 < 1.60 \quad (4)$$

$$50 < vd1 < 85 \quad (5)$$

where nd1 represents a refractive index of a correction-lens-group last lens, which is a lens of the correction lens group and located in a position closest to the fixed lens group, and vd1 represents an Abbe number of the correction-lens-group last lens.

When the conditional expression (4) is satisfied, an increase in the field curvature in the case where the correction lens group is moved in the direction of the optical axis can be suppressed. Further, When the conditional expression (5) is satisfied, an increase in chromatic aberration of magnification in the case where the correction lens group is moved in the direction of the optical axis can be suppressed.

In the aspect of the invention, it is desirable that the projection system further includes a lens barrel that holds the entire lens system, a temperature sensor that detects a temperature in the lens barrel, a moving mechanism that moves the correction lens group in the direction of the optical axis, and a correction controller that drives the moving mechanism based on an output from the temperature sensor. The controller can therefore drive the moving mechanism based on the output from the temperature sensor to automatically correct astigmatism that worsens due to a temperature change.

A projection-type image display apparatus according to another aspect of the invention includes the projection system described above and an image display device having the predetermined pixel pitch and disposed in a back focus position of the projection system.

The projection-type image display apparatus according to the aspect of the invention allows correction of astigmatism due to a temperature change only by moving one of the correction lens groups of the projection system in the direction of the optical axis. The astigmatism due to a temperature change is therefore readily corrected. Further, a change in the back focus position of the projection system that occurs when the correction lens group is moved to correct the astigmatism due to a temperature change is smaller than the depth of focus of the projection system. Defocus that occurs due to a change in the back focus position can therefore be avoided.

The projection-type image display apparatus according to the aspect of the invention projects light having a luminous flux greater than or equal to 20 klm. In the projection-type image display apparatus that provides the brightness of this level, the temperature of a lens that forms the projection system tends to increase when an image is projected, and astigmatism and other aberrations are therefore likely to occur. In contrast, in the aspect of the invention, the astigmatism due to a temperature change can be corrected only by moving one of the correction lens groups of the projection system in the direction of the optical axis. The quality of a projected image can therefore be maintained. It is noted that lm (lumen) is the unit representing a luminous flux and corresponds to a luminous flux omnidirectionally radiated within a solid angle of 1 steradian from a standard point source having a luminosity of 1 candela.

BRIEF DESCRIPTION OF THE DRAWINGS

The invention will be described with reference to the accompanying drawings, wherein like numbers reference like elements.

FIG. 4 shows data on lenses of the projection system according to Example 1.

FIG. 9 shows data on lenses of the projection system according to Example 2.

FIG. 14 shows data on lenses of the projection system according to Example 3.

DESCRIPTION OF EXEMPLARY EMBODIMENTS

A projection system and a projection-type image display apparatus including the projection system according to an embodiment of the invention will be described below in detail with reference to the drawings.

Projection-type Image Display Apparatus

Figure 1:
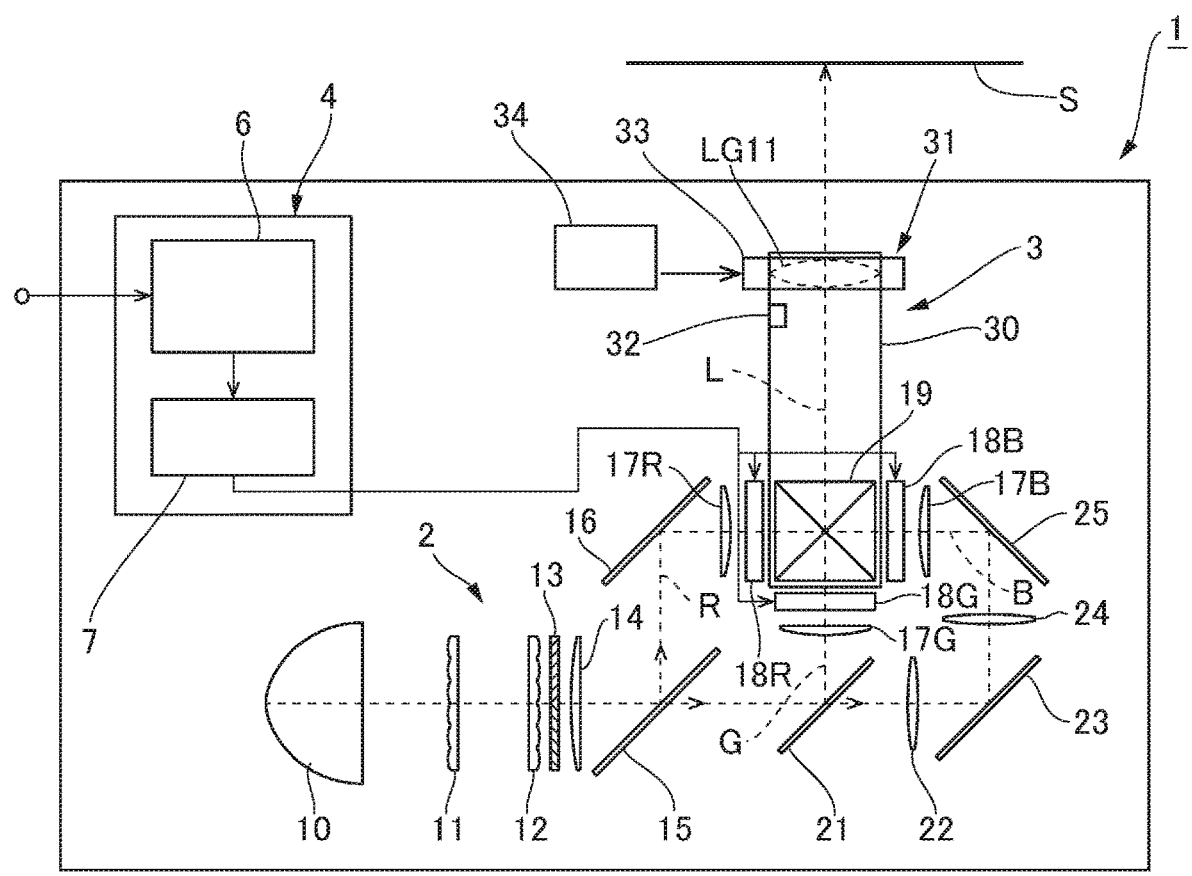
FIG. 1 shows a schematic configuration of a projection-type image display apparatus including a projection system according to an embodiment of the invention.

FIG. 1 is a schematic configuration diagram of a projector including the projection system according to the embodiment of the invention. The projector 1 (projection-type image display apparatus) includes an image light generating system 2, which generates image light to be projected on a screen S, a projection system 3, which enlarges and projects the image light, and a controller 4, as shown in FIG. 1. The projector 1 projects light having a luminous flux greater than or equal to 20 klm.

Image Light Generating System and Controller

The image light generating system 2 includes a light source 10, a first integrator lens 11, a second integrator lens 12, a polarization conversion element 13, and a superimposing lens 14. The light source 10 is formed, for example, of an ultrahigh-pressure mercury lamp or a solid-state light source. The first integrator lens 11 and the second integrator lens 12 each include a plurality of lens elements arranged in an array. The first integrator lens 11 divides the light flux from the light source 10 into a plurality of sub-light fluxes. The lens elements of the first integrator lens 11 focus the light flux from the light source 10 in the vicinity of the lens elements of the second integrator lens 12.

The polarization conversion element 13 converts each of the sub-light fluxes from the second integrator lens 12 into predetermined linearly polarized light. The superimposing lens 14 superimposes images of the lens elements of the first integrator lens 11 on one another via the second integrator lens 12 on a display area of each of liquid crystal panels 18R, 18G, and 18B, which will be described later.

The image light generating system 2 further includes a first dichroic mirror 15, a reflection mirror 16 and a field lens 17R, and the liquid crystal panel 18R. The first dichroic mirror 15 reflects R light, which is part of the light rays incident via the superimposing lens 14, and transmits G light and B light, which are part of the light rays incident via the superimposing lens 14. The R light reflected by the first dichroic mirror 15 travels via the reflection mirror 16 and the field lens 17R and incidents on the liquid crystal panel 18R. The liquid crystal panel 18R modulates the R light in accordance with an image signal to form a red image.

The image light generating system 2 further includes a second dichroic mirror 21, a field lens 17G, and the liquid crystal panel 18G. The second dichroic mirror 21 reflects the G light, which is part of the light rays incident via the first dichroic mirror 15, and transmits the B light, which is part of the light rays incident via the first dichroic mirror 15. The G light reflected off the second dichroic mirror 21 travels via the field lens 17G and incidents on the liquid crystal panel 18G. The liquid crystal panel 18G modulates the G light in accordance with an image signal to form a green image.

The image light generating system 2 further includes a relay lens 22, a reflection mirror 23, a relay lens 24, a reflection mirror 25, a field lens 17B, and the liquid crystal panel 18B. The B light having passed through the second dichroic mirror 21 travels via the relay lens 22, the reflection mirror 23, the relay lens 24, the reflection mirror 25, and the field lens 17B and incidents on the liquid crystal panel 18B. The liquid crystal panel 18B modulates the B light in accordance with an image signal to form a blue image.

The liquid crystal panels 18R, 18G, and 18B are each an image display device having a predetermined pixel pitch P. The liquid crystal panels 18R, 18G, and 18B surround a cross dichroic prism 19 in three directions. The cross dichroic prism 19 is a light combining prism and combines the light fluxes modulated by the liquid crystal panels 18R, 18G, and 18B with one another to produce image light.

The cross dichroic prism 19 forms part of the projection system 3. The projection system 3 enlarges the combined image light produced by the cross dichroic prism 19 (images formed by liquid crystal panels 18R, 18G, and 18B) and projects the enlarge image light on the screen S. The projection system 3 has a zoom function of changing the projection magnification. The projection system 3 is accommodated in a lens barrel 30.

The projection system 3 includes an aberration correcting mechanism 31, which corrects an aberration change that occurs in accordance with a change in the temperature of the projection system 3. The aberration correcting mechanism includes a temperature sensor 32, which detects the temperature in the lens barrel 30, and a moving mechanism 33, which moves a correction lens group LG11 (see FIGS. 1, 3, 7, 8, 12, and 13), which is one of a plurality of lens groups that form the projection system 3 and is located in a position closest to the screen in the projection system 3, in the direction of an optical axis L. The moving mechanism 33 moves the correction lens group LG11 which is so supported by a support mechanism that is not shown as to be movable in the direction of the optical axis L, toward the screen S or away therefrom. The moving mechanism 33 includes a drive source, such as a motor. The aberration correcting mechanism 31 further includes a correction controller 34, which drives the moving mechanism 33 based on the output from the temperature sensor 32 to move the correction lens group LG11 in the direction of the optical axis L. Exemplary specific configurations of the projection system 3 will be described later.

The controller 4 includes an image processor 6, to which an external image signal, such as a video signal, is inputted, and a display driver 7, which drives the liquid crystal panels 18R, 18G, and 18B based on the image signal outputted from the image processor 6.

The image processor 6 converts the image signal inputted from an external apparatus into image signals each containing grayscales and other factors of the corresponding color. The display driver 7 operates the liquid crystal panels 18R, 18G, and 18B based on the color image signals outputted from the image processor 6. The image processor 6 thus causes the liquid crystal panels 18R, 18G, and 18B to display images corresponding to the image signals.

Projection System

The projection system 3 will next be described. In the following sections, Examples 1 to 3 will be described as examples of the configuration of the projection system 3 incorporated in the projector 1.

EXAMPLE 1

Figure 2:
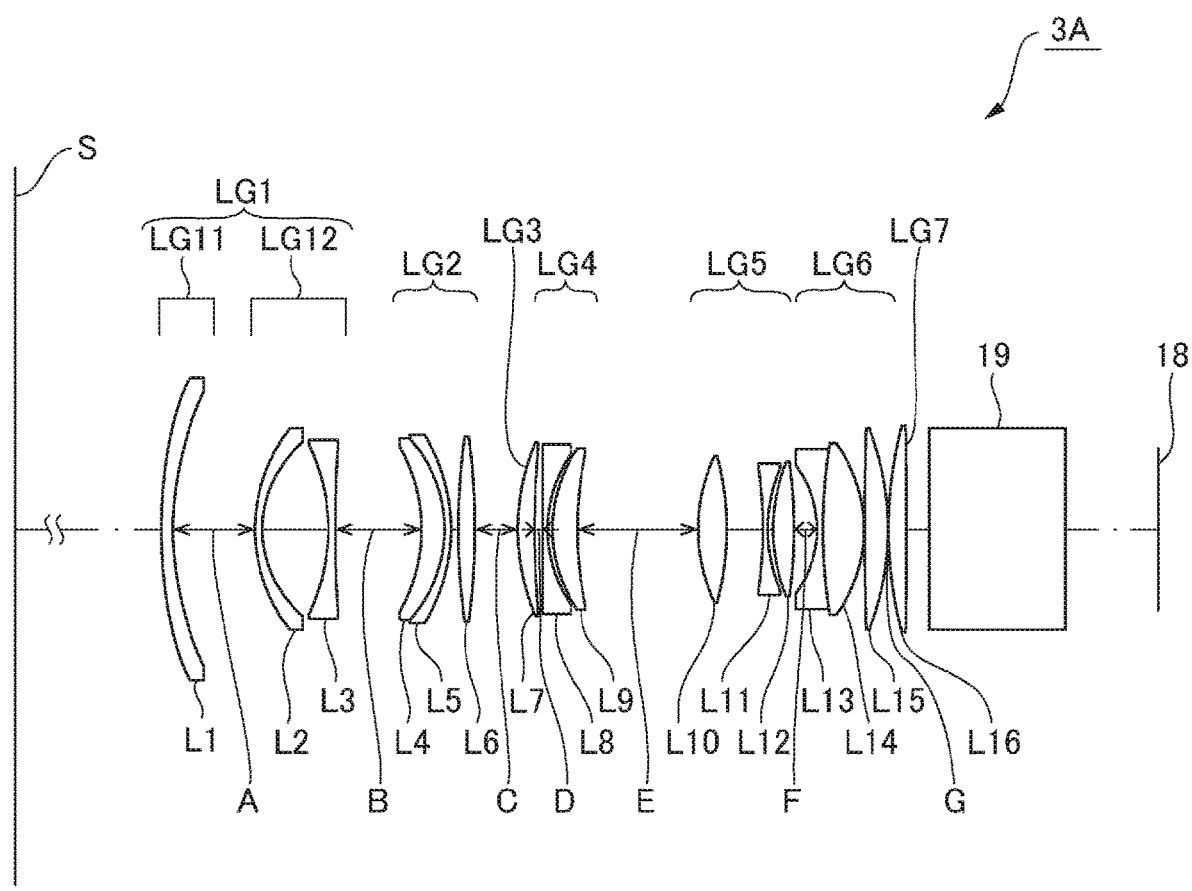
FIG. 2 is a configuration diagram of a projection system according to Example 1 in a case where each lens of the projection system is located in a wide-angle position.
Figure 3:
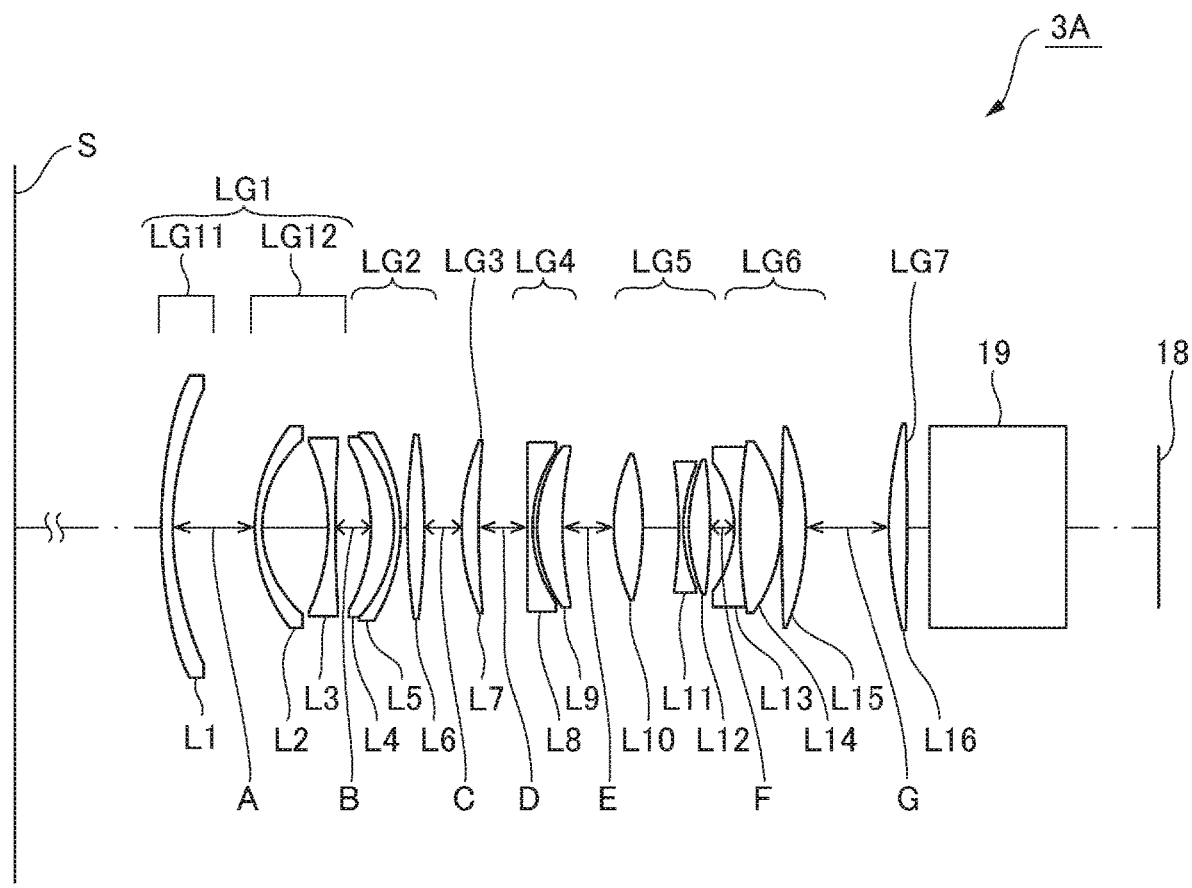
FIG. 3 is a configuration diagram of the projection system according to Example 1 in a case where each lens of the projection system is located in a telescopic position.
Figure 5:
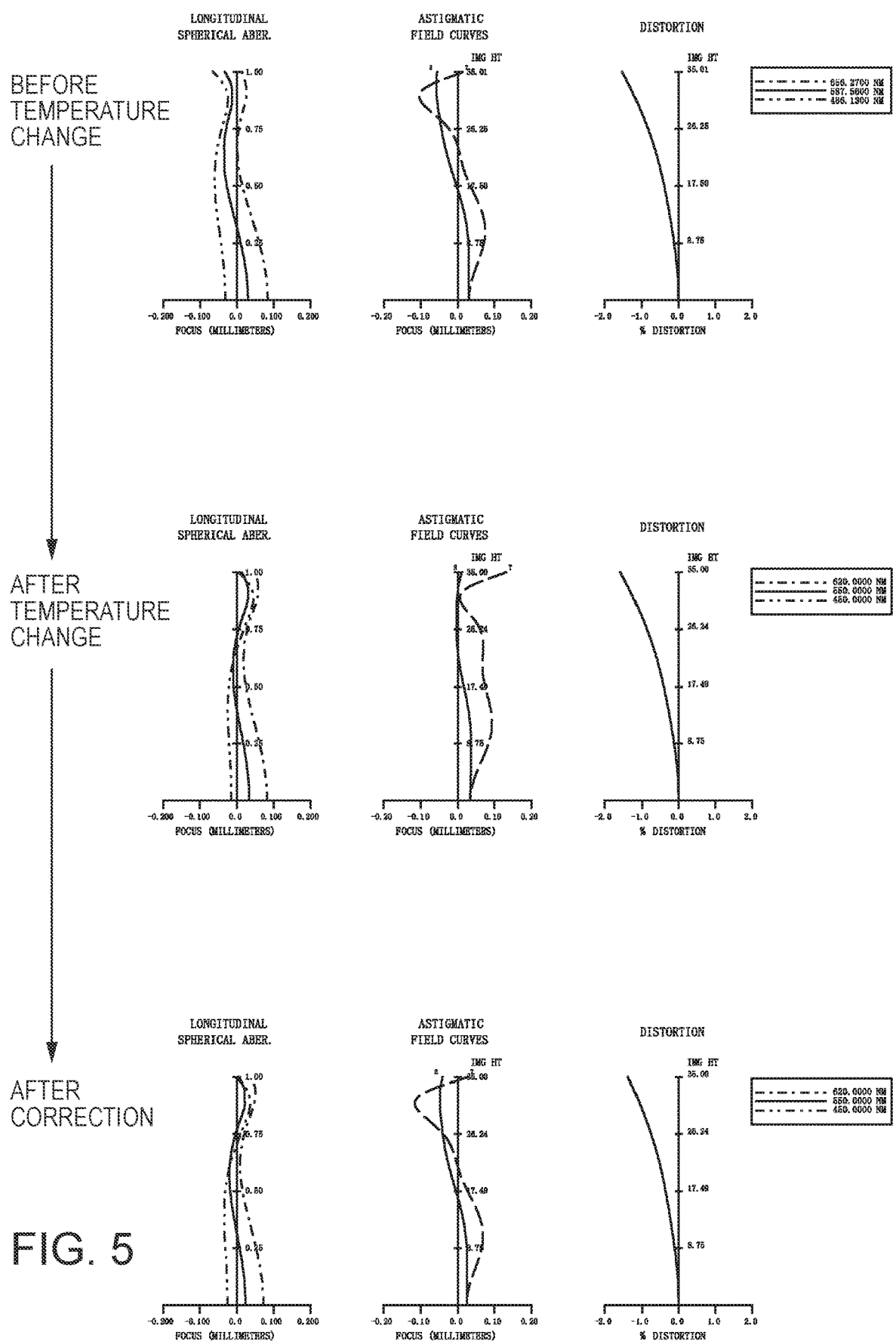
FIG. 5 is an aberration diagram of the projection system according to Example 1 in the case where each lens of the projection system is located in the wide-angle position.
Figure 6:
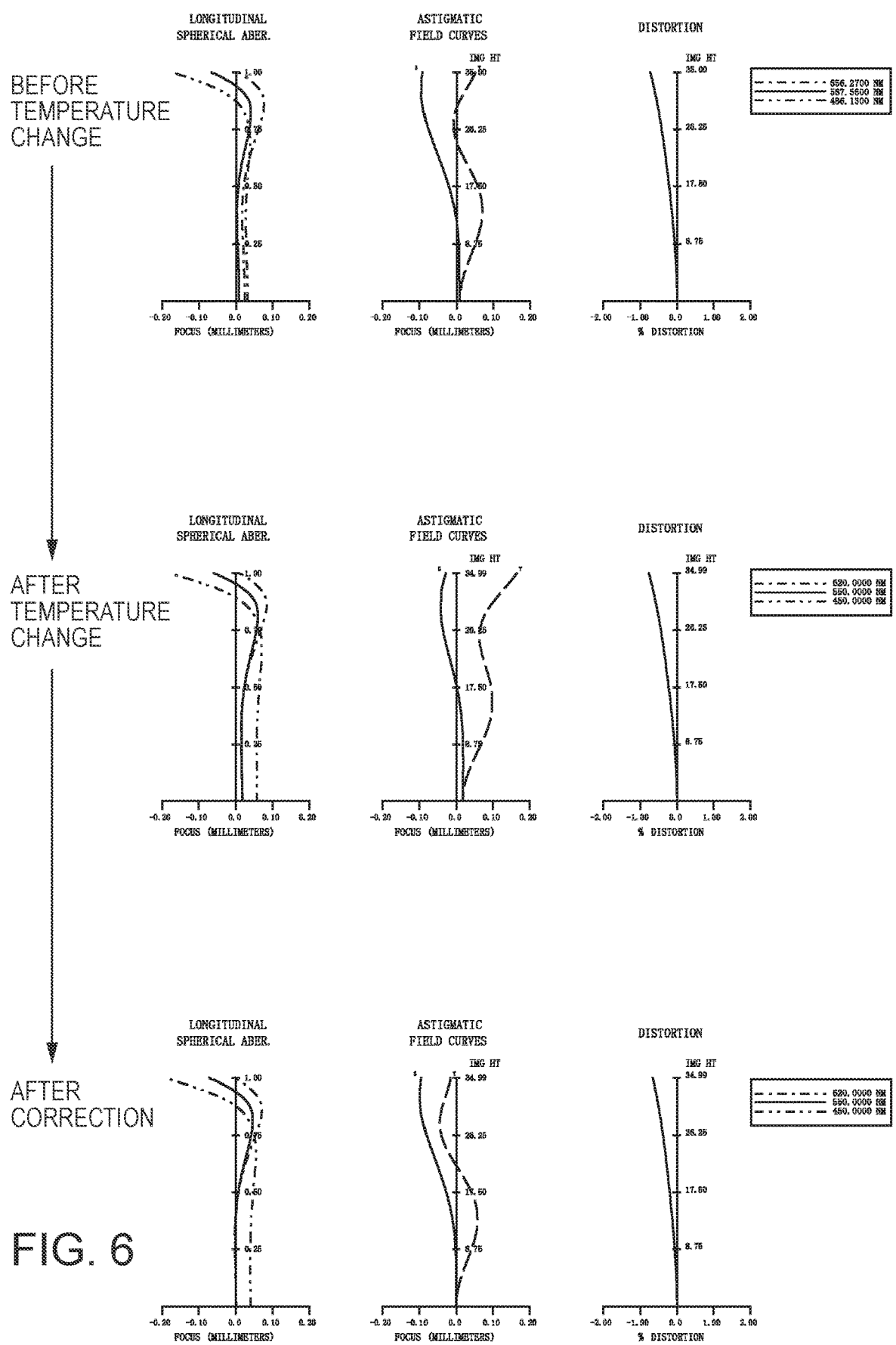
FIG. 6 is an aberration diagram of the projection system according to Example 1 in the case where each lens of the projection system is located in the telescopic position.

FIGS. 2 and 3 are configuration diagrams of a projection system according to Example 1. In FIG. 2, each lens that forms the projection system according to Example 1 is located in a wide-angle position where the focal length of the projection system is minimized. In FIG. 3, each lens that forms the projection system according to Example 1 is located in a telescopic position where the focal length of the projection system is maximized. FIG. 4 shows data on the lenses of the projection system according to Example 1. FIG. 5 is an aberration diagram (spherical aberration, astigmatism, and distortion) in the case where each lens of the projection system according to Example 1 is located in the wide-angle position. FIG. 6 is an aberration diagram (spherical aberration, astigmatism, and distortion) in the case where each lens of the projection system according to Example 1 is located in the telescopic position. FIGS. 5 and 6 each show an aberration diagram in a case where the projection system has a reference temperature (before temperature change), an aberration diagram in a case where the temperature of the projection system has increased from the reference temperature by 20° C. (after temperature change), and an aberration diagram in a case where the correction lens group LG11 has been moved from a reference position to a correction position to correct astigmatism having worsened due to the temperature change (after correction).

A projection system 3A according to the present example includes 16 lenses, a first lens L1 to a sixteenth lens L16, as shown in FIGS. 2 and 3. The projection system 3A includes a first lens group LG1, a second lens group LG2, a third lens group LG3, a fourth lens group LG4, a fifth lens group LG5, a sixth lens group LG6, and a seventh lens group LG7 sequentially arranged from the side facing the screen S toward the liquid crystal panels 18. The liquid crystal panels 18 are located in the back focus position of the projection system 3A. The cross dichroic prism 19 is located between the seventh lens group LG7 and the liquid crystal panels 18.

The first lens group LG1 and the seventh lens group LG7 are lens groups that do not move in the direction of the optical axis L when the projection magnification is changed with the aid of the zoom function. That is, the first lens group LG1 and the seventh lens group LG7 are lens groups that do not move in magnification changing operation. The first lens group LG1 is formed of three lenses, the first lens L1, the second lens L2, and the third lens L3. The first lens group LG1 includes the correction lens group LG11, which moves in the direction of the optical axis L to correct astigmatism that worsens in accordance with a temperature change, and a fixed lens group LG12, which is disposed on the side opposite the screen S with respect to the correction lens group LG11 and does not move in the direction of the optical axis L. The correction lens group LG11 is formed of the first lens L1. The fixed lens group LG12 is formed of the second lens L2 and the third lens L3. The first lens L1 has aspheric surfaces on opposite sides, the side facing the screen S and the side facing the liquid crystal panels 18. The second lens L2 (fixed-lens-group first lens), which is located in a position closest to the screen S in the fixed lens group LG12, is a negative lens. The seventh lens group LG7 is formed of the sixteenth lens L16.

The second lens group LG2, the third lens group LG3, the fourth lens group LG4, the fifth lens group LG5, and the sixth lens group LG6 are lens groups that move in the direction of the optical axis L when the projection magnification is changed with the aid of the zoom function (that is, in magnification changing operation). The second lens group LG2 is formed of three lenses, the fourth lens L4, the fifth lens L5, and the sixth lens L6. The fourth lens L4 and the fifth lens L5 are bonded to each other into a doublet. The third lens group LG3 is formed of the seventh lens L7. The fourth lens group LG4 is formed of the eighth lens L8 and the ninth lens L9. The fifth lens group LG5 is formed of three lenses, the tenth lens L10, the eleventh lens L11, and the twelfth lens L12. The sixth lens group LG6 is formed of three lenses, the thirteenth lens L13, the fourteenth lens L14, and the fifteenth lens L15. The thirteenth lens L13 and the fourteenth lens L14 are bonded to each other into a doublet.

Data on the projection system 3A are as follows: In the present example, a reference wavelength λ is set at 587.56 nm.

Zoom ratio: 1.34

Focal length: 71.11 mm (in wide-angle position)/95.62 mm (in telescopic position)

F number: 1.96 (in wide-angle position)/2.29 (in telescopic position)

Back focal length (in air): 90.16 mm

Diameter of effective image circle: ϕ70 mm

Maximum angle of view (half angle of view): 26.5° (in wide-angle position)/20.2° (in telescopic position)

FIG. 4 shows lens data on the lenses L1 to L16, which form the projection system 3A. In FIG. 4, OBJ in the thickness/gap field represents an inter-surface distance on the optical axis (m) from the first lens L1 to the screen S. The gap A in the thickness/gap field represents a value that changes when an aberration produced due to a temperature change is corrected. The gap A is an inter-surface distance on the optical axis (mm) between the correction lens group LG11 and the fixed lens group LG12. The gaps B, C, D, E, F, and G in the thickness/gap field each represent a value that differs between the case where the lenses L1 to L16 are located in the wide-angle position and the case where the lenses L1 to L16 are located in the telescopic position. The gaps B, C, D, E, F, and G are each an inter-surface distance on the optical axis (mm) between the adjacent lens groups. Reference character nd represents the refractive index of each of the lenses L1 to L16. Reference character vd represents the Abbe number of each of the lenses L1 to L16.

The aspheric coefficients of the first and second surfaces of the first lens L1, which are aspheric surfaces, are as follows.

|  | First surface | Second surface |
| --- | --- | --- |
| Radius of curvature | 216.922 | 128.975 |
| Conic constant (K) | −1.467 | −1.719 |
| Fourth-order coefficient (A) | 9.66234E−08 | 5.66419E−09 |
| Sixth-order coefficient (B) | −5.13267E−12 | −2.31131E−11 |
| Eighth-order coefficient (C) | −2.19282E−15 | 2.68541E−15 |
| Tenth-order coefficient (D) | 9.21819E−19 | 4.12250E−20 |
| Twelfth-order coefficient (E) | 8.65528E−23 | 1.68220E−22 |
| Fourteenth-order coefficient (F) | −8.21895E−27 | 4.96701E−26 |
| Sixteenth-order coefficient (G) | 2.01043E−30 | −2.61118E−30 |

The values of OBJ and the gaps B, C, D, E, F, and G are as follows.

| OBJ | 7.5 | 10.125 |
| --- | --- | --- |
|  | (in wide-angle position) | (in telescopic position) |
| Gap B | 37.982 | 15.581 |
|  | (in wide-angle position) | (in telescopic position) |
| Gap C | 18.787 | 16.376 |
|  | (in wide-angle position) | (in telescopic position) |
| Gap D | 3.524 | 21.455 |
|  | (in wide-angle position) | (in telescopic position) |
| Gap E | 53.109 | 22.849 |
|  | (in wide-angle position) | (in telescopic position) |
| Gap F | 10.109 | 10.629 |
|  | (in wide-angle position) | (in telescopic position) |
| Gap G | 0.200 | 36.820 |
|  | (in wide-angle position) | (in telescopic position) |

Correction Lens Group

The correction lens group LG11 will be described in detail. Comparison between the aberration diagrams in the upper portion of FIGS. 5 and 6, which show aberrations before a temperature change, and the aberration diagrams in the middle portion of FIGS. 5 and 6, which show aberrations after the temperature change (increase in temperature by 20° C.), shows that in the case where the temperature of the projection system 3A increases from the reference temperature expected in advance by 20° C. when an image is projected, the optical characteristics of the projection system 3A change and the astigmatism worsens (changes). To solve the problem described above, in the projection system 3A, the correction lens group LG11 for correcting the worsened astigmatism is provided in the first lens group LG1, which does not move when the projection magnification is changed with the aid of the zoom function, and the correction lens group LG11 is moved in the direction of the optical axis L to correct the worsened astigmatism.

The correction lens group LG11 moves between a reference position and a correction position. The reference position is the position where the correction lens group LG11 is located in the state in which the temperature of the projection system 3A is the reference temperature expected in advance. The aberration diagrams before and after the temperature change in FIGS. 5 and 6 show aberrations in the case where the correction lens group LG11 is located in the reference position. The correction position is the position of the correction lens group LG11 in the state in which when the temperature of the projection system 3A increases from the reference temperature by 20° C., the correction lens group LG11 is moved in the direction of the optical axis L to correct the astigmatism having worsened due to the temperature change. In the state in which the correction lens group LG11 is located in the correction position, the worsened astigmatism (change in astigmatism) is corrected, and the aberration diagrams are close to those before the temperature change, as shown in the post-correction aberration diagrams in the lower portion of FIGS. 5 and 6.

The gap A in the thickness/gap field in FIG. 4 in the case where the correction lens group LG11 is located in the reference position differs from the gap A in the case where the correction lens group LG11 is located in the correction position. The values of the gap A are as follows.

|  | Reference position | Correction position |
| --- | --- | --- |
| Gap A (in wide-angle position) | 36.061 | 36.761 |
| Gap A (in telescopic position) | 36.061 | 36.761 |

In the present example, let $\Delta M20$ be the amount of movement of the correction lens group LG11 (distance between reference position and correction position) that corrects the astigmatism having worsened when the temperature has increased by 20° C., and $\Delta M20$=+0 0.7 mm both in the wide-angle and telescopic positions. $\Delta M20$ is determined by an experiment or a simulation in which the correction lens group LG11 is actually moved in the projection system 3A. $\Delta M20$ has a positive value in the case where the correction lens group LG11 that moves from the reference position to a correction position moves toward the screen S. $\Delta M20$ has a negative value in the case where the correction lens group LG11 that moves from the reference position to a correction position moves away from the screen S.

In the present example, let $\Delta BF$ be the amount of movement of the back focus position in the case where the correction lens group LG11 is moved from the reference position to a correction position, and $\Delta BF$ in the wide-angle and telescopic positions is as follows.

$\Delta BF 0.01$(in wide-angle position)/0.018(in telescopic position)

The temperature of the projection system 3A can be the temperature in the lens barrel 30, which holds the lenses L1 to L16. That is, the temperature detected with the temperature sensor 32 can be the temperature of the projection system 3A.

Let f1 be the focal length of the correction lens group LG11, and f1=-636.811. Let f2 be the focal length of the second lens L2, and f2=-338.014.

The projection system 3A satisfies the following conditional expression (1), where P represents the pixel pitch in an image displayed by each of the liquid crystal panels 18, FNO represents the F number of the entire lens system, and $\Delta BF$ represents the amount of movement of the back focus position in the case where the correction lens group LG11 is moved by the amount of movement for correction of the aberration that changes when the temperature changes by 20° C. ($\Delta M20$). The conditional expression (1) shows that the amount of movement of the back focus position $\Delta BF$ is smaller than the depth of focus of the projection system 3A when the correction lens group LG11 is moved by the amount of movement for correction of the aberration that worsens when the temperature changes by 20° C. ($\Delta M20$=+ 0.7 mm).

$$|\Delta BF20| < P \times FNO \times \sqrt{2} \quad (1)$$

Specifically, in the present example, P=0.010 mm. In the wide-angle position, FNO=1.96. In the telescopic position, FNO=2.29. In the wide-angle position, $\Delta BF$=0.01. In the telescopic position, $\Delta BF$=0.018. The projection system 3A therefore satisfies the conditional expression (1) as follows.

$|0.010|<0.010\times1.96\times\sqrt{2}=0.028$ (In wide-angle position)

$|0.018|<0.010\times2.29\times\sqrt{2}=0.032$ (In telescopic position)

The projection system 3A further satisfies the following conditional expression (2), where f represents the focal length of the entire lens system, and f1 represents the focal length of the correction lens group LG11.

$$1.5 < |f1/f| \quad (2)$$

Specifically, in the present example, f=71.11 in the wide-angle position, and f=95.62 in the telescopic position. Further, f1=-636.811. The projection system 3A therefore satisfies the conditional expression (2) as follows.

$1.5<|-636.811/71.11|=9.0$ (In wide-angle position)

$1.5<|-636.811/95.62|=6.7$ (In telescopic position)

In the present example, the correction lens group LG11, which is located in a position closest to the screen S in the projection system 3A, is moved in the direction of the optical axis L to correct degradation in the optical characteristics of the projection system 3A. Worsened astigmatism is therefore readily corrected. Further, in the present example, since the focal length f1 of the correction lens group LG11 and the focal length f of the entire lens system satisfy the conditional expression (2), astigmatism that worsens due to a temperature change is readily corrected by moving the correction lens group LG11 to the direction of the optical axis L.

Further, since the projection system 3A satisfies the conditional expression (1), the amount of movement of the back focus position $\Delta BF20$ is smaller than or equal to the depth of focus of the projection system 3A in the case where the correction lens group LG11 is moved by the amount of movement $\Delta M20$ for correction of the aberration that changes when the temperature changes by 20° C. In other words, since the projection system 3A satisfies the conditional expression (1), the amount of movement of the back focus position $\Delta BF20$ in the case where the correction lens group LG11 is moved from the reference position to a correction position is small enough not to affect the quality of a projected image. In other words, defocus that occurs when the correction lens group LG11 is moved from the reference position to a correction position can be avoided. A change in the back focus position of the projection system 3A that occurs due to a temperature change can be suppressed in a design phase. Therefore, as long as the amount of movement of the back focus position $\Delta BF20$ in the case where the correction lens group LG11 is moved is smaller than the depth of focus of the projection system 3A, it is unnecessary to provide a second correction lens group for correcting the back focus position when the correction lens group LG11 is moved. The number of lens groups to be moved in the direction of the optical axis L to correct astigmatism that worsens due to a temperature change can therefore be reduced.

In the present example, the second lens L2, which is located in a position closest to the screen S in the fixed lens group LG12, is a negative lens, and let f2 be the focal length of the second lens L2, and the following conditional expression (3) is satisfied.

$$0.1 < |f2/f1| < 0.9 \tag{3}$$

Specifically, in the present example, f1=−636.811, and f2=−338.014. The projection system 3A in the present example therefore satisfies the conditional expression (3) as follows.

$$0.1 < |-338.014/-636.811| = 0.5 < 0.9$$

In a case where |f2/f1| is greater than the upper limit or smaller than the lower limit in the conditional expression (3), the amount of distortion increases in some cases when the correction lens group LG11 is moved to correct astigmatism produced due to a temperature change. On the other hand, in the case where the focal length f2 of the second lens L2, which is a negative lens, and the focal length f1 of the correction lens group LG11 satisfy the conditional expression (3), the increase in the distortion can be suppressed. Further, when the conditional expression (3) is satisfied, an increase in field curvature can be suppressed.

Further, in the present example, let nd1 be the refractive index of the first lens L1, which forms the correction lens group LG11, and vd1 be the Abbe number of the first lens L1, and the following conditional expressions (4) and (5) are satisfied.

$$1.45 < nd1 < 1.60 \tag{4}$$

$$50 < vd1 < 85 \tag{5}$$

That is, in the present example, nd1=1.509415 and vd1=55.9, as shown in FIG. 4. The conditional expressions (4) and (5) are therefore satisfied in the present example. When the conditional expression (4) is satisfied, an increase in the field curvature in the case where the correction lens group LG11 is moved in the direction of the optical axis L can be suppressed. Further, When the conditional expression (5) is satisfied, an increase in chromatic aberration of magnification in the case where the correction lens group LG11 is moved in the direction of the optical axis L can be suppressed.

The projection system 3A includes the lens barrel 30, which holds the entire lens system, the temperature sensor 32, which detects the temperature in the lens barrel 30, the moving mechanism 33, which moves the correction lens group LG11 in the direction of the optical axis L, and the correction controller 34, which drives the moving mechanism 33 based on the output from the temperature sensor 32. The correction controller 34 can therefore drive the moving mechanism 33 based on the output from the temperature sensor 32 to automatically correct astigmatism that worsens due to a temperature change.

In the present example, the relationship between a change in the temperature in the lens barrel 30 (increase in temperature from reference temperature) and the position where the correction lens group LG11 is located on the optical axis L and which allows correction of astigmatism produced due to the temperature change (correction position) is determined in an experiment or a simulation. Further, the correction controller 34 of the projection system 3A stores and holds the relationship between an increase in the temperature from the reference temperature and a correction position, for example, in the form of a table. The correction controller 34 therefore refers to the storage based on an increase in the temperature from the reference temperature and drives the moving mechanism 33 based on the result of the reference to move the correction lens group LG11 to a correction position.

Further, in the present example, since the projection system 3A readily allows correction of astigmatism that worsens due to a temperature change, the quality of a projected image can be maintained even in a case where the light projected from the projector 1 has a luminous flux greater than or equal to 20 klm so that the temperature of each of the lenses L1 to L16, which form the projection system 3A, is likely to increase when an image is projected and the astigmatism is therefore likely to worsen.

The correction lens group LG11 may instead be manually moved from the reference position to a correction position.

In the example described above, the correction lens group LG11 is moved in the direction of the optical axis L when astigmatism worsens due to a temperature change. The correction lens group LG11 can also be moved in the direction of the optical axis L to correct astigmatism, for example, in a case where the astigmatism worsens when the projection magnification is changed.

EXAMPLE 2

Figure 7:
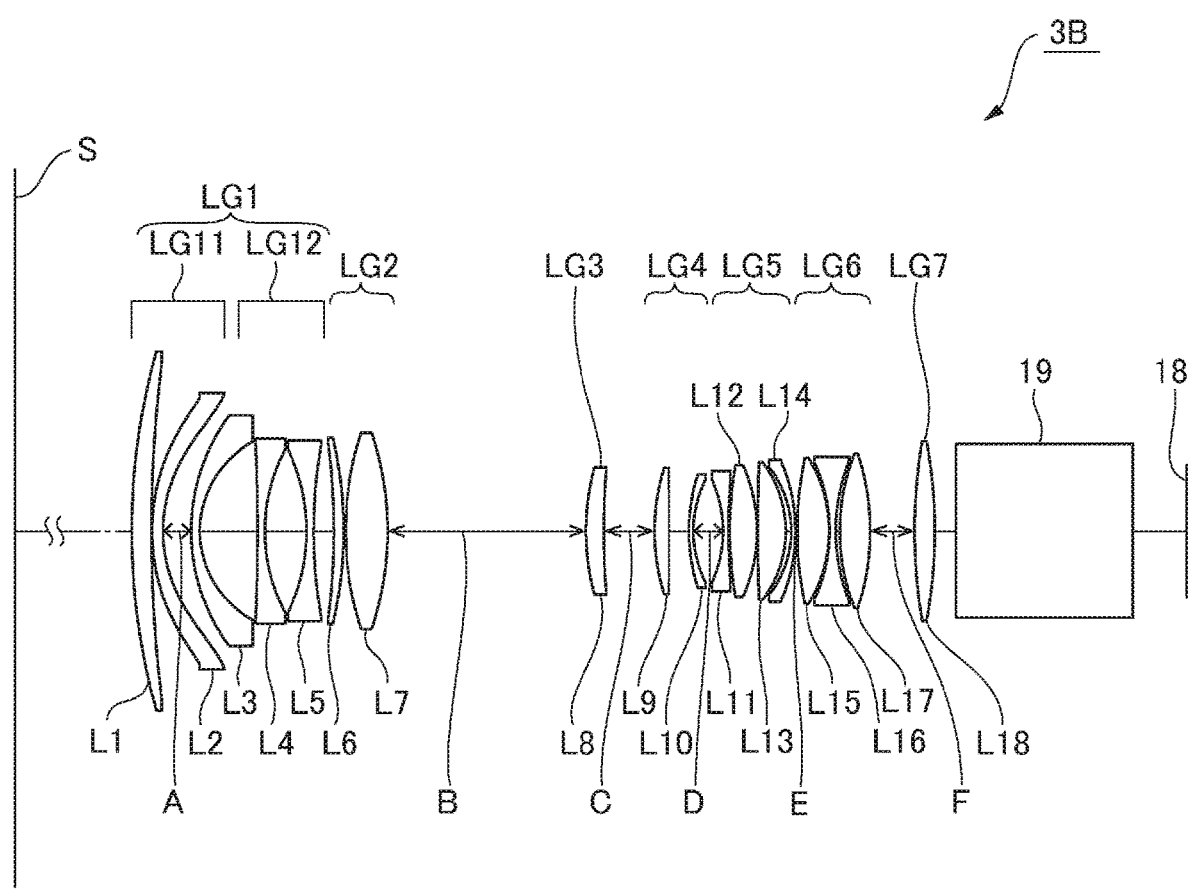
FIG. 7 is a configuration diagram of a projection system according to Example 2 in the case where each lens of the projection system is located in the wide-angle position.
Figure 8:
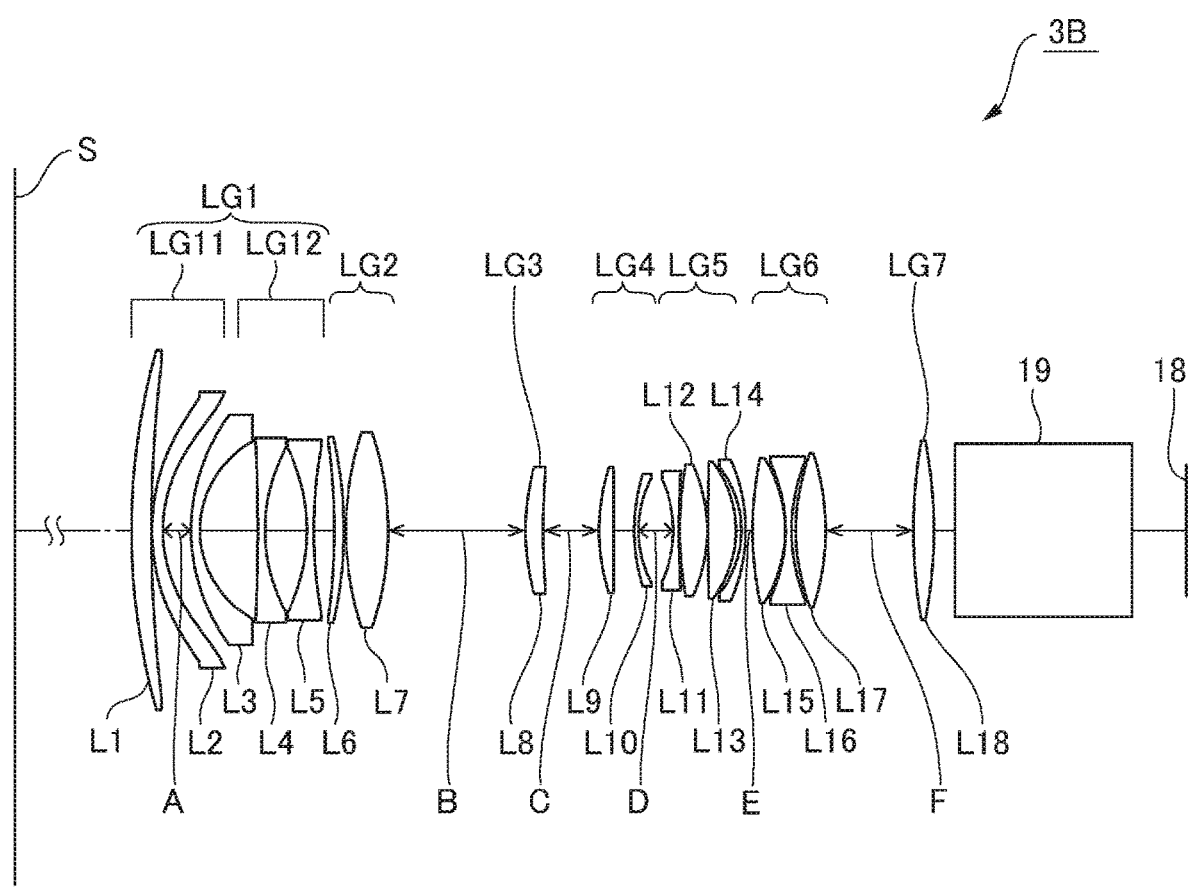
FIG. 8 is a configuration diagram of the projection system according to Example 2 in the case where each lens of the projection system is located in the telescopic position.
Figure 10:
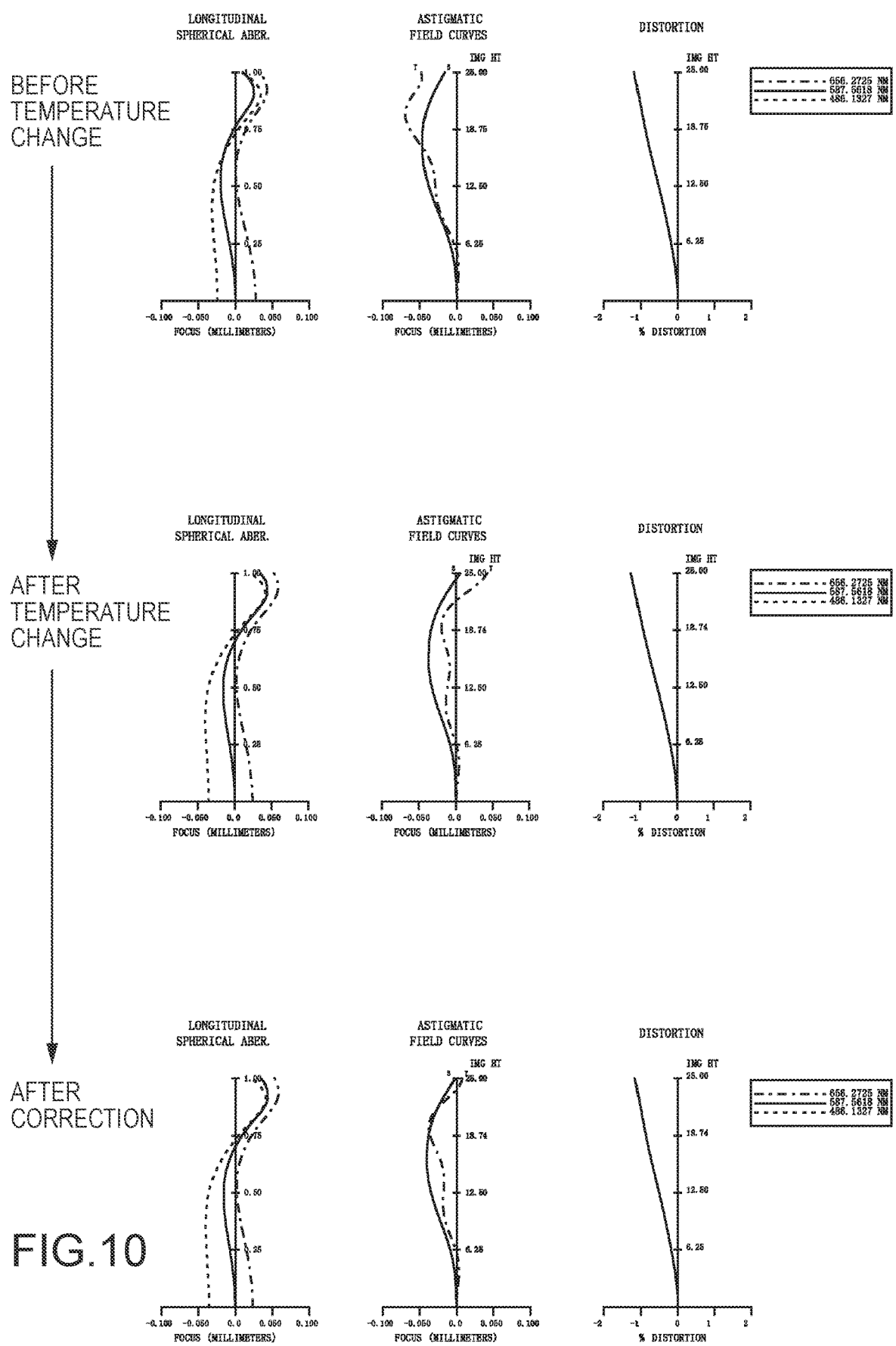
FIG. 10 is an aberration diagram of the projection system according to Example 2 in the case where each lens of the projection system is located in the wide-angle position.
Figure 11:
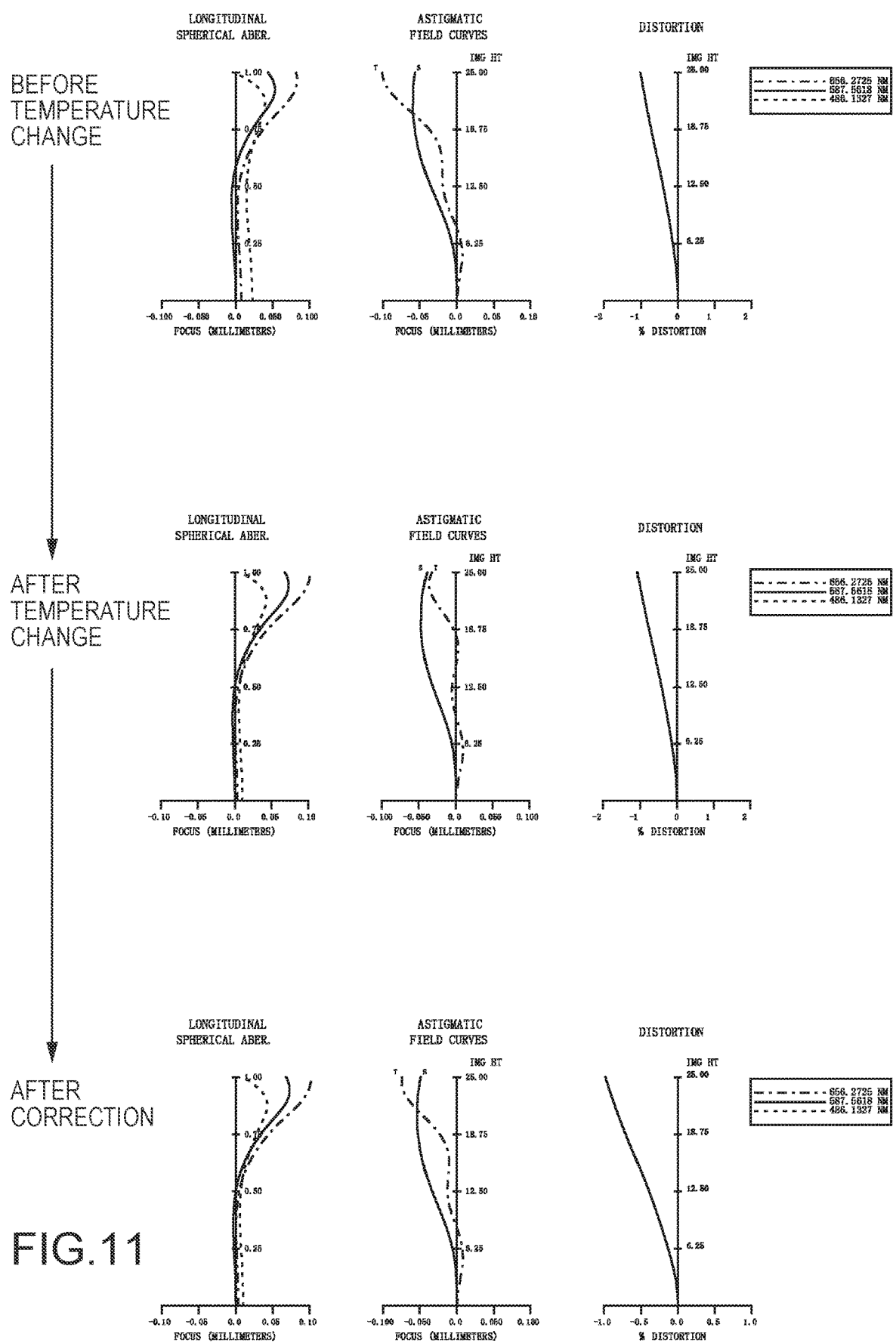
FIG. 11 is an aberration diagram of the projection system according to Example 2 in the case where each lens of the projection system is located in the telescopic position.

FIGS. 7 and 8 are configuration diagrams of a projection system according to Example 2. In FIG. 7, each lens that forms the projection system according to Example 2 is located in the wide-angle position, where the focal length of the projection system is minimized. In FIG. 8, each lens that forms the projection system according to Example 2 is located in the telescopic position, where the focal length of the projection system is maximized. FIG. 9 shows data on the lenses of the projection system according to Example 2. FIG. 10 is an aberration diagram (spherical aberration, astigmatism, and distortion) in the case where each lens of the projection system according to Example 2 is located in the wide-angle position. FIG. 11 is an aberration diagram (spherical aberration, astigmatism, and distortion) in the case where each lens of the projection system according to Example 2 is located in the telescopic position. FIGS. 10 and 11 each show an aberration diagram in the case where the projection system has a reference temperature (before temperature change), an aberration diagram in the case where the temperature of the projection system has increased from the reference temperature by 20° C. (after temperature change), and an aberration diagram in the case where the correction lens group LG11 has been moved from a reference position to a correction position to correct astigmatism having worsened due to the temperature change (after correction).

A projection system 3B according to the present example includes 18 lenses, a first lens L1 to an eighteenth lens L18, as shown in FIGS. 7 and 8. The projection system 3B includes a first lens group LG1, a second lens group LG2, a third lens group LG3, a fourth lens group LG4 a fifth lens group LG5, a sixth lens group LG6, and a seventh lens group LG7 sequentially arranged from the side facing the screen S toward the liquid crystal panels 18. The liquid crystal panels 18 are located in the back focus position of the projection system 3B. The cross dichroic prism 19 is located between the seventh lens group LG7 and the liquid crystal panels 18.

The first lens group LG1, the second lens group LG2, and the seventh lens group LG7 are lens groups that do not move in the direction of the optical axis L when the projection magnification is changed with the aid of the zoom function. That is, the first lens group LG1, the second lens group LG2, and the seventh lens group LG7 are lens groups that do not move in magnification changing operation. The first lens group LG1 is formed of five lenses, the first lens L1, the second lens L2, the third lens L3, the fourth lens L4, and the fifth lens L5. The first lens group LG1 includes a correction lens group LG11, which moves in the direction of the optical axis L to correct astigmatism that worsens in accordance with a temperature change, and a fixed lens group LG12, which is disposed on the side opposite the screen S with respect to the correction lens group LG11 and does not move in the direction of the optical axis L. The correction lens group LG11 is formed of the first lens L1 and the second lens L2. The fixed lens group LG12 is formed of the third lens L3, the fourth lens L4, and the fifth lens L5. The second lens L2 has aspheric surfaces on opposite sides, the side facing the screen S and the side facing the liquid crystal panels 18. The third lens L3 (fixed-lens-group first lens), which is located in a position closest to the screen S in the fixed lens group LG12, is a negative lens.

The second lens group LG2 is formed of two lenses, the sixth lens L6 and the seventh lens L7. The seventh lens group LG7 is formed of the eighteenth lens L18.

The third lens group LG3, the fourth lens group LG4, the fifth lens group LG5, and the sixth lens group LG6 are lens groups that move in the direction of the optical axis L when the projection magnification is changed with the aid of the zoom function (that is, in magnification changing operation). The third lens group LG3 is formed of the eighth lens L8. The fourth lens group LG4 is formed of the ninth lens L9 and the tenth lens L10. The fifth lens group LG5 is formed of four lenses, the eleventh lens L11, the twelfth lens L12, the thirteenth lens L13, and the fourteenth lens L14. The sixth lens group LG6 is formed of three lenses, the fifteenth lens L15, the sixteenth lens L16, and the seventeenth lens L17.

Data on the projection system 3B are as follows: In the present example, the reference wavelength λ is set at 587.56 nm.

Zoom ratio: 1.20

Focal length: 29.87 mm (in wide-angle position)/35.83 mm (in telescopic position)

F number: 2.40 (in wide-angle position)/2.62 (in telescopic position)

Back focal length (in air): 70.98 mm

Diameter of effective image circle: φ50 mm

Maximum angle of view (half angle of view): 40.2° (in wide-angle position)/35.1° (in telescopic position)

FIG. 9 shows lens data on the lenses L1 to L18, which form the projection system 3B. In FIG. 9, OBJ in the thickness/gap field represents an inter-surface distance on the optical axis (m) from the first lens L1 to the screen S. The gap A in the thickness/gap field represents a value that changes when an aberration produced due to a temperature change is corrected. The gap A is an inter-surface distance on the optical axis (mm) between the correction lens group LG11 and the fixed lens group LG12. The gaps B, C, D, E, and F in the thickness/gap field each represent a value that differs between the case where the lenses L1 to L18 are located in the wide-angle position and the case where the lenses L1 to L18 are located in the telescopic position. The gaps B, C, D, E, and F are each an inter-surface distance on the optical axis (mm) between the adjacent lens groups. Reference character nd represents the refractive index of each of the lenses L1 to L18. Reference character vd represents the Abbe number of each of the lenses L1 to L18.

The aspheric coefficients of the surfaces on opposite sides of the second lens L2 (third and fourth surfaces), which are aspheric surfaces, are as follows.

|  | Third surface | Fourth surface |
|---|---|---|
| Radius of curvature | 84.350 | 57.275 |
| Conic constant (K) | −1.002 | −0.335 |
| Fourth-order coefficient (A) | 6.17595E−07 | 2.32600E−07 |
| Sixth-order coefficient (B) | −6.93154E−11 | −2.39935E−10 |
| Eighth-order coefficient (C) | −1.54068E−14 | 1.46172E−13 |
| Tenth-order coefficient (D) | −1.64525E−18 | −2.18608E−16 |
| Twelfth-order coefficient (E) | 8.98913E−22 | 1.01396E−19 |
| Fourteenth-order coefficient (F) | −6.43365E−25 | −2.50322E−23 |
| Sixteenth-order coefficient (G) | 7.00618E−29 | 2.65938E−27 |

The values of OBJ and the gaps B, C, D, E, and F are as follows.

|  |  |  |
|---|---|---|
| OBJ | 3.9 | 3.9 |
|  | (in wide-angle position) | (in telescopic position) |
| Gap B | 114.535 | 85.282 |
|  | (in wide-angle position) | (in telescopic position) |
| Gap C | 18.675 | 28.296 |
|  | (in wide-angle position) | (in telescopic position) |
| Gap D | 10.934 | 12.857 |
|  | (in wide-angle position) | (in telescopic position) |
| Gap E | 0.640 | 2.506 |
|  | (in wide-angle position) | (in telescopic position) |
| Gap F | 16.560 | 32.404 |
|  | (in wide-angle position) | (in telescopic position) |

Correction Lens Group

The correction lens group LG11 will be described in detail. Comparison between the aberration diagrams in the upper portion of FIGS. 10 and 11, which show aberrations before a temperature change, and the aberration diagrams in the middle portion of FIGS. 10 and 11, which show aberrations after the temperature change (increase in temperature by 20° C.), shows that in the case where the temperature of the projection system 3B increases from the reference temperature expected in advance by 20° C. when an image is projected, the optical characteristics of the projection system. 3B change and the astigmatism worsens (changes). To solve the problem described above, in the projection system 3B, the correction lens group LG11 for correcting the worsened astigmatism is provided in the first lens group LG1, which does not move when the projection magnification is changed with the aid of the zoom function, and the correction lens group LG11 is moved in the direction of the optical axis L to correct the worsened astigmatism.

The correction lens group LG11 moves between a reference position and a correction position. The reference position is the position where the correction lens group LG11 is located in the state in which the temperature of the projection system 3B is the reference temperature expected in advance. The aberration diagrams before and after the temperature change in FIGS. 10 and 11 show aberrations in the case where the correction lens group LG11 is located in the reference position. The correction position is the position of the correction lens group LG11 in the state in which when the temperature of the projection system 3B increases from the reference temperature by 20° C., the correction lens group LG11 is moved in the direction of the optical axis L to correct the astigmatism that worsens due to the temperature change. In the state in which the correction lens group LG11 is located in the correction position, the worsened astigmatism (change in astigmatism) is corrected, and the aberration diagrams are close to those before the temperature change, as shown in the post-correction aberration diagrams in the lower portion of FIGS. 10 and 11.

The gap A in the thickness/gap field in FIG. 9 in the case where the correction lens group LG11 is located in the reference position differs from the gap A in the case where the correction lens group LG11 is located in the correction position. The values of the gap A are as follows.

|  | Reference position | Correction position |
|---|---|---|
| Gap A (in wide-angle position) | 10.333 | 10.476 |
| Gap A (in telescopic position) | 10.333 | 10.524 |

In the present example, let ΔM20 be the amount of movement of the correction lens group LG11 (distance between reference position and correction position) that corrects the astigmatism having worsened when the temperature has increased by 20° C., and ΔM20=+0.143 mm in the wide-angle position, and ΔM20=+0.191 mm in the telescopic position. ΔM20 is determined by an experiment or a simulation in which the correction lens group LG11 is actually moved in the projection system 3B. ΔM20 has a positive value in the case where the correction lens group LG11 that moves from the reference position to a correction position moves toward the screen S. ΔM20 has a negative value in the case where the correction lens group LG11 that moves from the reference position to a correction position moves away from the screen S.

In the present example, let ΔBF be the amount of movement of the back focus position in the case where the correction lens group LG11 is moved from the reference position to a correction position, and ΔBF in the wide-angle and telescopic positions is as follows.

ΔBF−0.0005(in wide-angle position)/−0.0010(in telescopic position)

The temperature of the projection system 3B can be the temperature in the lens barrel 30, which holds the lenses L1 to L18. That is, the temperature detected with the temperature sensor 32 can be the temperature of the projection system 3B.

Let f1 be the focal length of the correction lens group LG11, and f1=−568.733. Let f2 be the focal length of the third lens L3, and f2=−102.670.

The projection system 3B satisfies the following conditional expression (1), where P represents the pixel pitch in an image displayed by each of the liquid crystal panels 18, FNO represents the F number of the entire lens system, and ΔBF represents the amount of movement of the back focus position in the case where the correction lens group LG11 is moved by the amount of movement for correction of the aberration that changes when the temperature changes by 20° C. (ΔM20). The conditional expression (1) shows that the amount of movement of the back focus position ΔBF is smaller than the depth of focus of the projection system 3B when the correction lens group LG11 is moved by the amount of movement for correction of the aberration that worsens when the temperature changes by 20° C. (ΔM20=+0.147 mm or +0.191 mm).

$$|\Delta BF20|<P\times FNO\times\sqrt{2} \tag{1}$$

Specifically, in the present example, P=0.010 mm. In the wide-angle position, FNO=2.40. In the telescopic position, FNO=2.62. In the wide-angle position, ΔBF=−0.0005. In the telescopic position, ΔBF=−0.0010. The projection system 3B therefore satisfies the conditional expression (1) as follows

|−0.0005|<0.010×2.40×√2=0.034         (In wide-angle position)

|−0.00010|<0.010×2.62×√2=0.037       (In telescopic position)

The projection system 3B further satisfies the following conditional expression (2), where f represents the focal length of the entire lens system, and f1 represents the focal length of the correction lens group LG11.

$$1.5<|f1/f| \tag{2}$$

Specifically, in the present example, f=29.87 in the wide-angle position, and f=35.83 in the telescopic position. Further, f1=−568.733. The projection system 3B therefore satisfies the conditional expression (2) as follows.

1.5<|−568.733/29.87|=19.1         (In wide-angle position)

1.5<|−568.733/35.83|=15.9         (In telescopic position)

In the present example, the correction lens group LG11, which is located in a position closest to the screen S in the projection system 3B, is moved in the direction of the optical axis L to correct degradation in the optical characteristics of the projection system 3B. Worsened astigmatism is therefore readily corrected. Further, in the present example, since the focal length f1 of the correction lens group LG11 and the focal length f of the entire lens system satisfy the conditional expression (2), astigmatism that worsens due to a temperature change is readily corrected by moving the correction lens group LG11 to the direction of the optical axis L.

Further, since the projection system 3B satisfies the conditional expression (1), the amount of movement of the back focus position ΔBF20 is smaller than or equal to the depth of focus of the projection system 3B in the case where the correction lens group LG11 is moved by the amount of movement ΔM20 for correction of the aberration that changes when the temperature changes by 20° C. In other words, since the projection system 3B satisfies the conditional expression (1), the amount of movement of the back focus position ΔBF20 in the case where the correction lens group LG11 is moved from the reference position to a correction position is small enough not to affect the quality of a projected image. In other words, defocus that occurs when the correction lens group LG11 is moved from the reference position to a correction position can be avoided. A change in the back focus position of the projection system 3B that occurs due to a temperature change can be suppressed in a design phase. Therefore, as long as the amount of movement of the back focus position ΔBF20 in the case where the correction lens group LG11 is moved is smaller than the depth of focus of the projection system 3B, it is unnecessary to provide a second correction lens group for correcting the back focus position when the correction lens group LG11 is moved. The number of lens groups to be moved in the direction of the optical axis L to correct astigmatism that worsens due to a temperature change can therefore be reduced.

In the present example, the second lens L2, which is located in a position closest to the screen S in the fixed lens group LG12, is a negative lens, and let f2 be the focal length of the third lens L3, and the following conditional expression (3) is satisfied.

$$0.1<|f2/f1|<0.9 \tag{3}$$

Specifically, in the present example, f1=−568.733, and f2=−102.670. The projection system 3B in the present example therefore satisfies the conditional expression (3) as follows.

0.1<|−102.670/−568.733|=0.2<0.9

In a case where |f2/f1| is greater than the upper limit or smaller than the lower limit in the conditional expression (3), the amount of distortion increases in some cases when the correction lens group LG11 is moved to correct astigmatism produced due to a temperature change. On the other hand, in the case where the focal length f2 of the second lens L2, which is a negative lens, and the focal length f1 of the correction lens group LG11 satisfy the conditional expression (3), the increase in the distortion can be suppressed. Further, when the conditional expression (3) is satisfied, an increase in field curvature can be suppressed.

Further, in the present example, let nd1 be the refractive index of the second lens L2, which is a lens of the correction lens group LG11 and located in a position closest to the fixed lens group LG12, and vd1 be the Abbe number of the second lens L2, and the following conditional expressions (4) and (5) are satisfied.

$$1.45 < nd1 < 1.60 \quad (4)$$

$$50 < vd1 < 85 \quad (5)$$

That is, in the present example, nd1=1.53116 and vd1=56.0, as shown in FIG. 9. The conditional expressions (4) and (5) are therefore satisfied in the present example. When the conditional expression (4) is satisfied, an increase in the field curvature in the case where the correction lens group LG11 is moved in the direction of the optical axis L can be suppressed. Further, When the conditional expression (5) is satisfied, an increase in chromatic aberration of magnification in the case where the correction lens group LG11 is moved in the direction of the optical axis L can be suppressed.

The projection system 3B includes the lens barrel 30, which holds the entire lens system, the temperature sensor 32, which detects the temperature in the lens barrel 30, the moving mechanism 33, which moves the correction lens group LG11 in the direction of the optical axis L, and the correction controller 34, which drives the moving mechanism 33 based on the output from the temperature sensor 32. The correction controller 34 can therefore drive the moving mechanism 33 based on the output from the temperature sensor 32 to automatically correct astigmatism that worsens due to a temperature change.

In the present example, the relationship between a change in the temperature in the lens barrel 30 (increase in temperature from reference temperature) and the position where the correction lens group LG11 is located on the optical axis L and which allows correction of astigmatism produced due to the temperature change (correction position) is determined in an experiment or a simulation. Further, the correction controller 34 of the projection system 3B stores and holds the relationship between an increase in the temperature from the reference temperature and a correction position, for example, in the form of a table. The correction controller 34 therefore refers to the storage based on an increase in the temperature from the reference temperature and drives the moving mechanism 33 based on the result of the reference to move the correction lens group LG11 to a correction position.

Further, in the present example, since the projection system 3B readily allows correction of astigmatism that worsens due to a temperature change, the quality of a projected image can be maintained even in the case where the light projected from the projector 1 has a luminous flux greater than or equal to 20 klm so that the temperature of each of the lenses L1 to L18, which form the projection system 3B, is likely to increase when an image is projected and the astigmatism is therefore likely to worsen.

The correction lens group LG11 may instead be manually moved from the reference position to a correction position.

In the example described above, the correction lens group LG11 is moved in the direction of the optical axis L when astigmatism worsens due to a temperature change. The correction lens group LG11 can also be moved in the direction of the optical axis L to correct astigmatism, for example, in a case where the astigmatism worsens when the projection magnification is changed.

EXAMPLE 3

Figure 12:
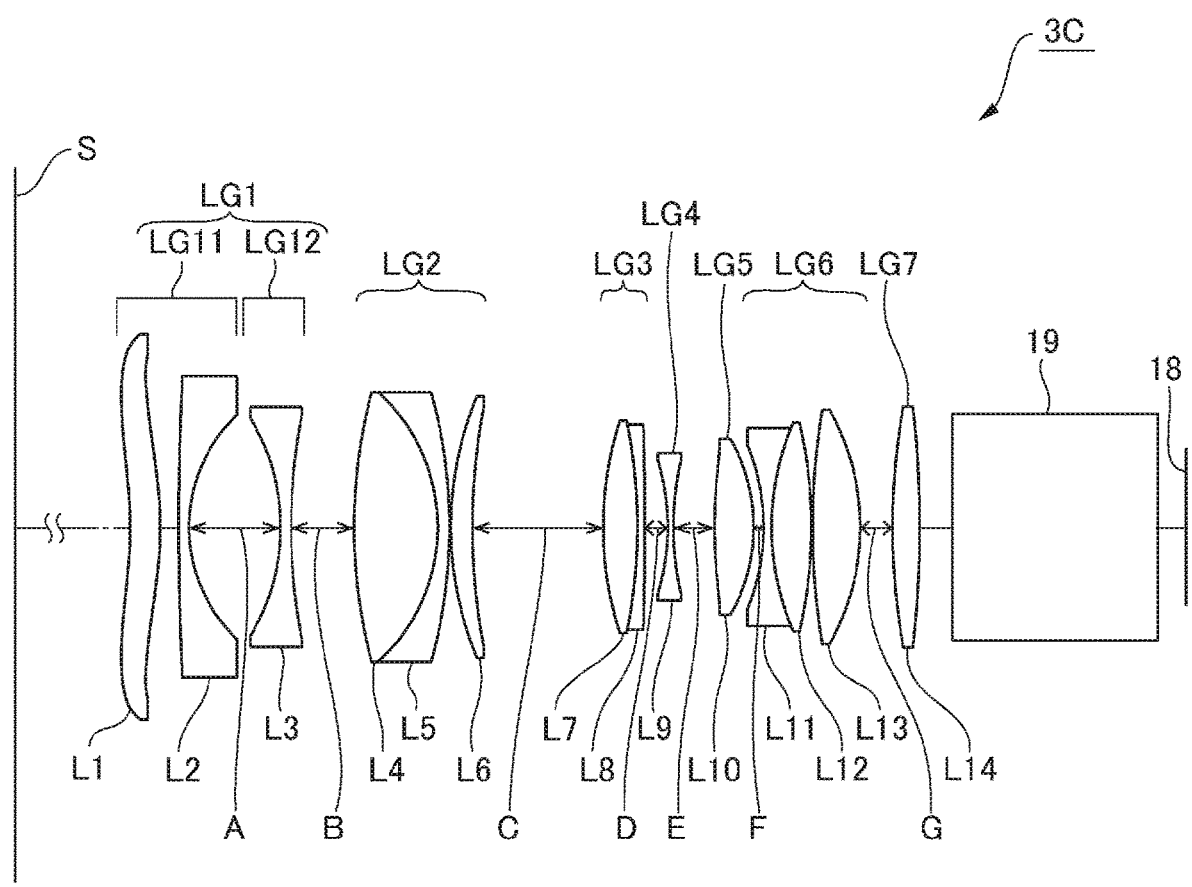
FIG. 12 is a configuration diagram of a projection system according to Example 3 in the case where each lens of the projection system is located in the wide-angle position.
Figure 13:
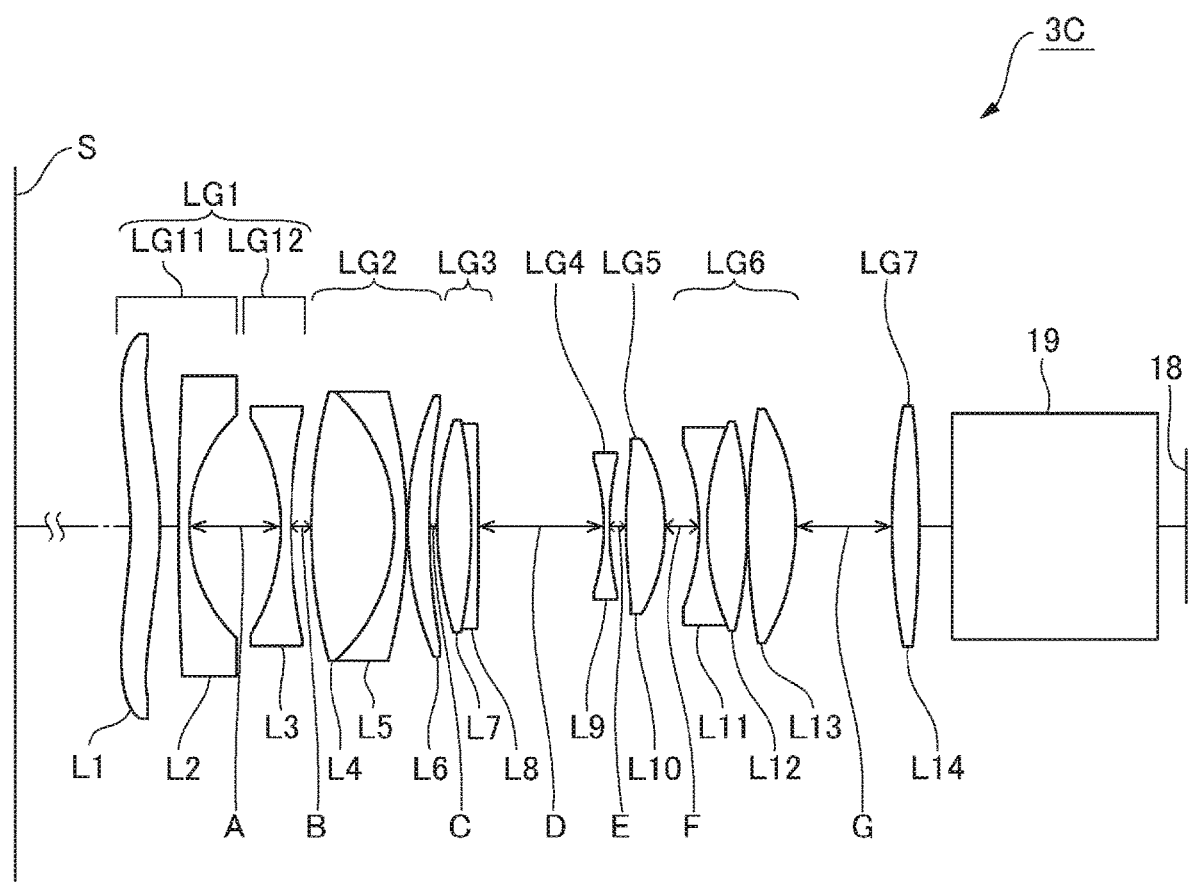
FIG. 13 is a configuration diagram of the projection system according to Example 3 in the case where each lens of the projection system is located in the telescopic position.
Figure 15:
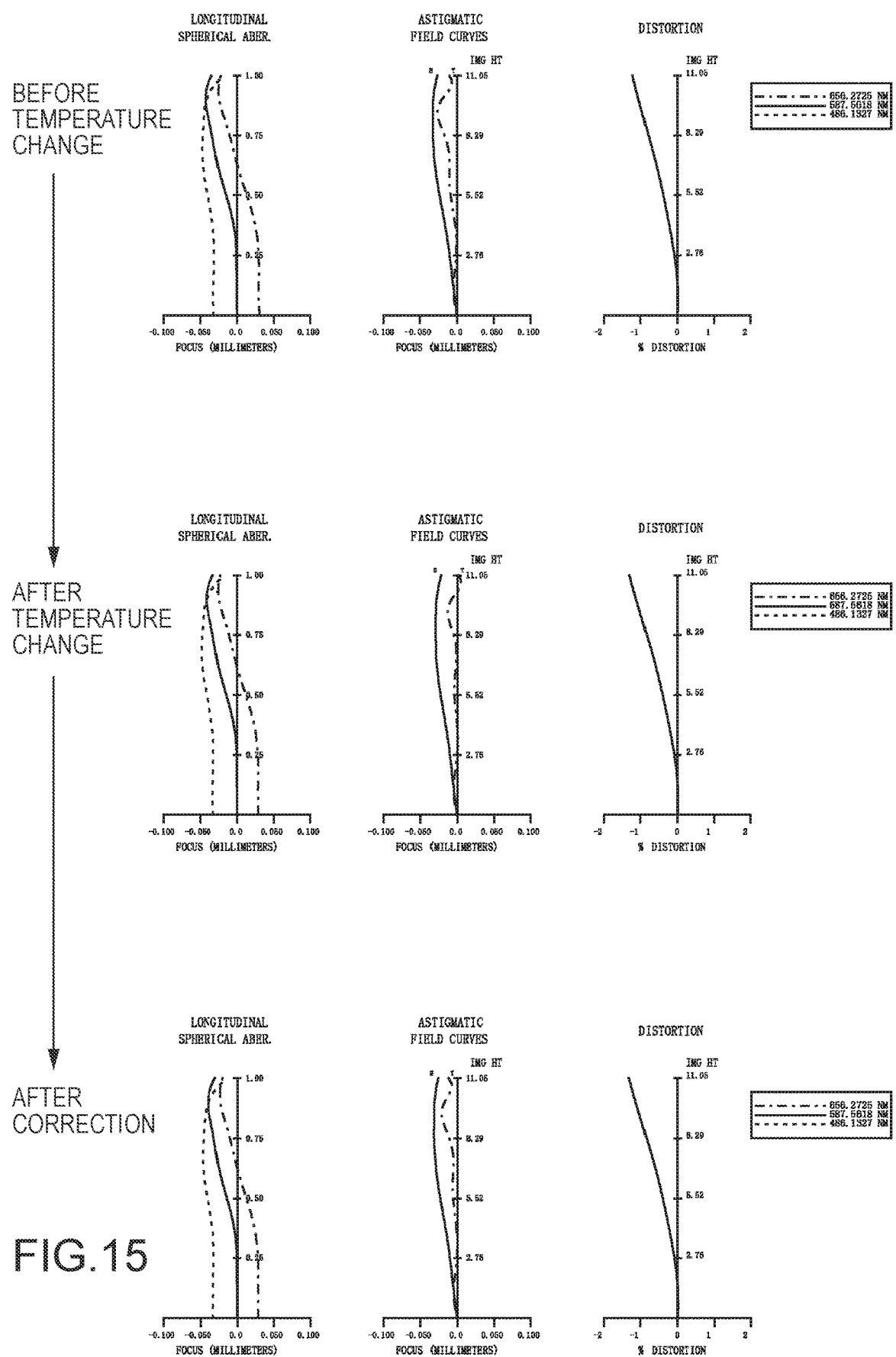
FIG. 15 is an aberration diagram of the projection system according to Example 3 in the case where each lens of the projection system is located in the wide-angle position.
Figure 16:
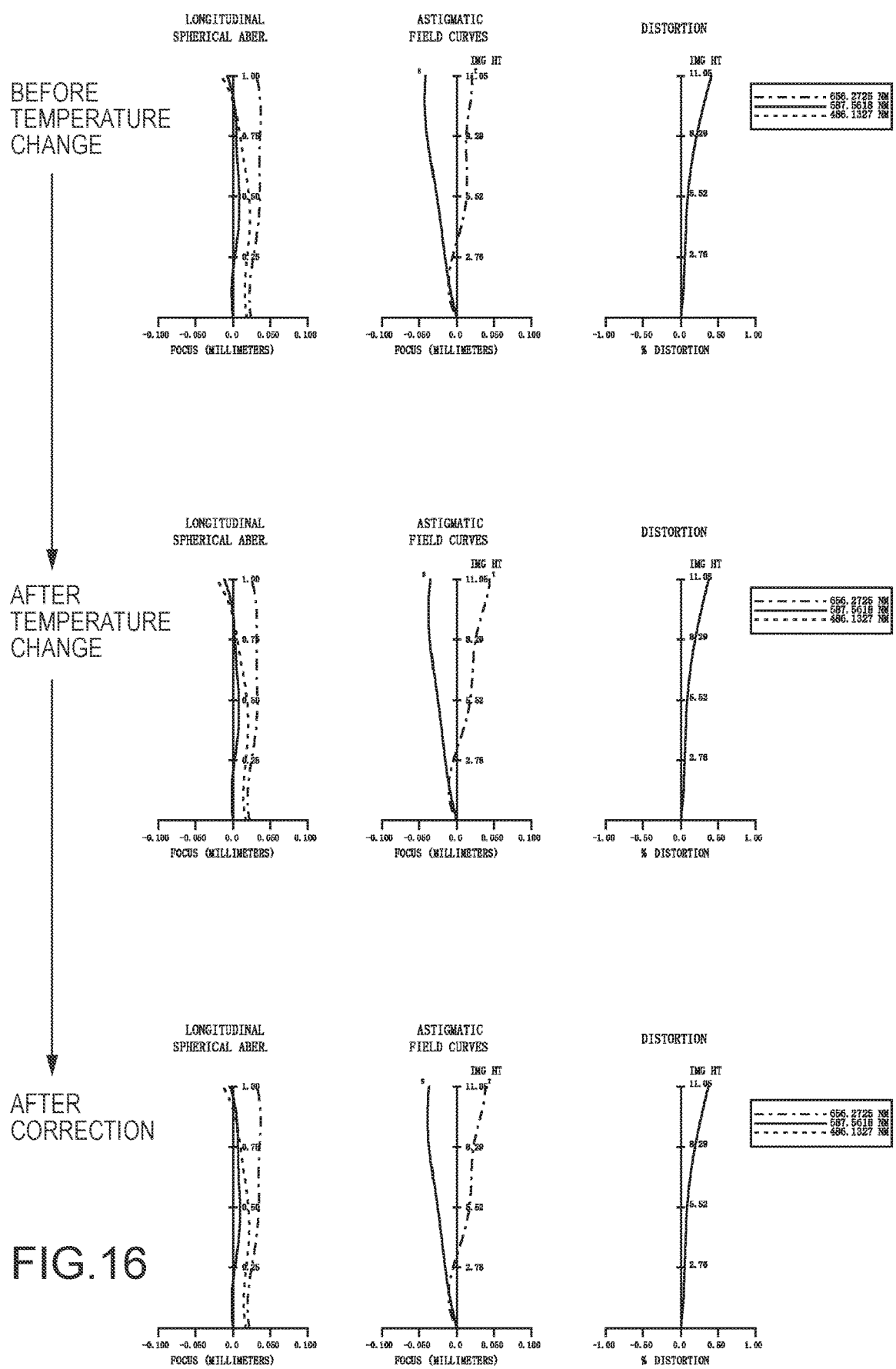
FIG. 16 is an aberration diagram of the projection system according to Example 3 in the case where each lens of the projection system is located in the telescopic position.

FIGS. 12 and 13 are configuration diagrams of a projection system according to Example 3. In FIG. 12, each lens that forms the projection system according to Example 3 is located in the wide-angle position, where the focal length of the projection system is minimized. In FIG. 13, each lens that forms the projection system according to Example 3 is located in the telescopic position, where the focal length of the projection system is maximized. FIG. 14 shows data on the lenses of the projection system according to Example 3. FIG. 15 is an aberration diagram (spherical aberration, astigmatism, and distortion) in the case where each lens of the projection system according to Example 3 is located in the wide-angle position. FIG. 16 is an aberration diagram (spherical aberration, astigmatism, and distortion) in the case where each lens of the projection system according to Example 3 is located in the telescopic position. FIGS. 15 and 16 each show an aberration diagram in the case where the projection system has a reference temperature (before temperature change), an aberration diagram in the case where the temperature of the projection system has increased from the reference temperature by 20° C. (after temperature change), and an aberration diagram in the case where the correction lens group LG11 has been moved from a reference position to a correction position to correct astigmatism having worsened due to the temperature change (after correction).

A projection system 3C according to the present example includes 14 lenses, a first lens L1 to a fourteenth lens L14, as shown in FIGS. 12 and 13. The projection system 3C includes a first lens group LG1, a second lens group LG2, a third lens group LG3, a fourth lens group LG4, a fifth lens group LG5, a sixth lens group LG6, and a seventh lens group LG7 sequentially arranged from the side facing the screen S toward the liquid crystal panels 18. The liquid crystal panels 18 are located in the back focus position of the projection system 3C. The cross dichroic prism 19 is located between the seventh lens group LG7 and the liquid crystal panels 18.

The first lens group LG1 and the seventh lens group LG7 are lens groups that do not move in the direction of the optical axis L when the projection magnification is changed with the aid of the zoom function. That is, the first lens group LG1 and the seventh lens group LG7 are lens groups that do not move in magnification changing operation. The first lens group LG1 is formed of three lenses, the first lens L1, the second lens L2, and the third lens L3. The first lens group LG1 includes a correction lens group LG11, which moves in the direction of the optical axis L to correct astigmatism that worsens in accordance with a temperature change, and a fixed lens group LG12, which is disposed on the side opposite the screen S with respect to the correction lens group LG11 and does not move in the direction of the optical axis L. The correction lens group LG11 is formed of the first lens L1 and the second lens L2. The fixed lens group LG12 is formed of the third lens L3. The first lens L1 has aspheric surfaces on opposite sides, the side facing the screen S and the side facing the liquid crystal panels 18 (odd-order aspheric surfaces). The second lens L2 is a negative lens. The seventh lens group LG7 is formed of the fourteenth lens L14.

The second lens group LG2, the third lens group LG3, the fourth lens group LG4, the fifth lens group LG5, and the sixth lens group LG6 are lens groups that move in the direction of the optical axis L when the projection magnification is changed with the aid of the zoom function (that is, in magnification changing operation). The second lens group LG2 is formed of three lenses, the fourth lens L4, the fifth lens L5, and the sixth lens L6. The fourth lens L4 and the fifth lens L5 are bonded to each other into a doublet. The third lens group LG3 is formed of the seventh lens L7 and the eighth lens L8. The seventh lens L7 and the eighth lens L8 are bonded to each other into a doublet. The fourth lens group LG4 is formed of the ninth lens L9. The fifth lens group LG5 is formed of the tenth lens L10. The tenth lens L10 has aspheric surfaces on opposite sides, the side facing the screen S and the side facing the liquid crystal panels 18. The sixth lens group LG6 is formed of three lenses, the eleventh lens L11, the twelfth lens L12, and the thirteenth lens L13. The eleventh lens L11 and the twelfth lens L12 are bonded to each other into a doublet.

Data on the projection system 3C are as follows: In the present example, the reference wavelength λ is set at 587.56 nm.

Zoom ratio: 1.59

Focal length: 18.51 mm (in wide-angle position)/29.39 mm (in telescopic position)

F number: 1.50 (in wide-angle position)/1.98 (in telescopic position)

Back focal length (in air): 29.82 mm

Diameter of effective image circle: ϕ22.1 mm

Maximum angle of view (half angle of view): 31.0° (in wide-angle position)/20.5° (in telescopic position)

FIG. 14 shows lens data on the lenses L1 to L14, which form the projection system 3C. In FIG. 14, OBJ in the thickness/gap field represents an inter-surface distance on the optical axis (m) from the first lens L1 to the screen S. The gap A in the thickness/gap field represents a value that changes when an aberration produced due to a temperature change is corrected. The gap A is an inter-surface distance on the optical axis (mm) between the correction lens group LG11 and the fixed lens group LG12. The gaps B, C, D, E, F, and G in the thickness/gap field each represent a value that differs between the case where the lenses L1 to L14 are located in the wide-angle position and the case where the lenses L1 to L14 are located in the telescopic position. The gaps B, C, D, E, F, and G are each an inter-surface distance on the optical axis (mm) between the adjacent lens groups. Reference character nd represents the refractive index of each of the lenses L1 to L14. Reference character νd represents the Abbe number of each of the lenses L1 to L14.

The aspheric coefficients of the first and second surfaces of the first lens L1, which are odd-order aspheric surfaces, are as follows.

|  | First surface | second surface |
| --- | --- | --- |
| Radius of curvature | −52.187 | −47.248 |
| Normalized radius | 0 | 0 |
| Conic constant (K) | 2.160 | 2.049 |
| Third-order coefficient (C4) | 5.850395E−06 | 1.008325E−07 |

-continued

|  | First surface | second surface |
| --- | --- | --- |
| Fourth-order coefficient (C5) | 2.916604E−05 | 2.755164E−05 |
| Fifth-order coefficient (C6) | 2.784228E−08 | 1.157410E−08 |
| Sixth-order coefficient (C7) | −4.929371E−08 | −4.701720E−08 |
| Seventh-order coefficient (C8) | −2.032565E−11 | −5.322946E−11 |
| Eighth-order coefficient (C9) | 9.028234E−11 | 9.406703E−11 |
| Ninth-order coefficient (C10) | −3.206681E−15 | −3.616954E−14 |
| Tenth-order coefficient (C11) | −1.140366E−13 | −1.214511E−13 |
| Eleventh-order coefficient (C12) | 2.354084E−17 | −1.220552E−18 |
| Twelfth-order coefficient (C13) | 9.714881E−17 | 1.285790E−16 |
| Thirteenth-order coefficient (C14) | 5.963628E−21 | 6.336274E−21 |
| Fourteenth-order coefficient (C15) | −8.972642E−21 | −2.112134E−20 |
| Fifteenth-order coefficient (C16) | −3.153100E−23 | −3.166408E−23 |
| Sixteenth-order coefficient (C17) | −2.951592E−23 | −6.248856E−23 |
| Seventeenth-order coefficient (C18) | −6.727139E−26 | −2.036477E−25 |
| Eighteenth-order coefficient (C19) | −3.241867E−26 | −3.482153E−26 |
| Nineteenth-order coefficient (C20) | −8.604023E−30 | −1.850030E−28 |
| Twentieth-order coefficient (C21) | 6.808065E−29 | 1.604326E−28 |

The aspheric coefficients of the seventeenth and eighteenth surfaces of the tenth lens L10, which are aspheric surfaces, are as follows.

|  | seventeenth surface | eighteenth surface |
| --- | --- | --- |
| Radius of curvature | 68.259 | −24.277 |
| Conic constant (K) | 15.848 | −0.267 |
| Fourth-order coefficient (A) | −1.28555E−05 | 3.05938E−06 |
| Sixth-order coefficient (B) | −6.41978E−09 | −2.48006E−08 |
| Eighth-order coefficient (C) | −5.40488E−12 | 3.36996E−10 |
| Tenth-order coefficient (D) | −2.92973E−12 | −3.63281E−12 |
| Twelfth-order coefficient (E) | 1.52239E−14 | 7.31354E−15 |
| Fourteenth-order coefficient (F) | −3.35705E−17 | −8.46287E−17 |
| Sixteenth-order coefficient (G) | 5.22138E−20 | 1.35021E−18 |
| Eighteenth-order coefficient (H) | −2.87241E−21 | −7.02776E−21 |

The values of OBJ and the gaps B, C, D, E, F, and G are as follows.

| OBJ | 1.63 | 1.63 |
| --- | --- | --- |
|  | (in wide-angle position) | (in telescopic position) |
| Gap B | 9.652 | 3.111 |
|  | (in wide-angle position) | (in telescopic position) |
| Gap C | 19.842 | 1.200 |
|  | (in wide-angle position) | (in telescopic position) |
| Gap D | 3.475 | 18.980 |
|  | (in wide-angle position) | (in telescopic position) |
| Gap E | 6.198 | 2.458 |
|  | (in wide-angle position) | (in telescopic position) |
| Gap F | 1.514 | 5.168 |
|  | (in wide-angle position) | (in telescopic position) |
| Gap G | 4.967 | 14.649 |
|  | (in wide-angle position) | (in telescopic position) |

Correction Lens Group

The correction lens group LG11 will be described in detail. Comparison between the aberration diagrams in the upper portion of FIGS. 15 and 16, which show aberrations before a temperature change, and the aberration diagrams in the middle portion of FIGS. 15 and 16, which show aberrations after the temperature change (increase in temperature by 20° C.), shows that in the case where the temperature of the projection system 3C increases from the reference temperature expected in advance by 20° C. when an image is projected, the optical characteristics of the projection system 3C change and the astigmatism worsens (changes). To solve the problem described above, in the projection system 3C, the correction lens group LG11 for correcting the worsened astigmatism is provided in the first lens group LG1, which does not move when the projection magnification is changed with the aid of the zoom function, and the correction lens group LG11 is moved in the direction of the optical axis L to correct the worsened astigmatism.

The correction lens group LG11 moves between a reference position and a correction position. The reference position is the position where the correction lens group LG11 is located in the state in which the temperature of the projection system 3C is the reference temperature expected in advance. The aberration diagrams before and after the temperature change in FIGS. 15 and 16 show aberrations in the case where the correction lens group LG11 is located in the reference position. The correction position is the position of the correction lens group LG11 in the state in which when the temperature of the projection system 3C increases from the reference temperature by 20° C., the correction lens group LG11 is moved in the direction of the optical axis L to correct the astigmatism that worsens due to the temperature change. In the state in which the correction lens group LG11 is located in the correction position, the worsened astigmatism (change in astigmatism) is corrected, and the aberration diagrams are close to those before the temperature change, as shown in the post-correction aberration diagrams in the lower portion of FIGS. 15 and 16.

The gap A in the thickness/gap field in FIG. 14 in the case where the correction lens group LG11 is located in the reference position differs from the gap A in the case where the correction lens group LG11 is located in the correction position. The values of the gap A are as follows.

|  | Reference position | Correction position |
| --- | --- | --- |
| Gap A (in wide-angle position) | 13.81 | 13.73 |
| Gap A (in telescopic position) | 13.81 | 13.76 |

In the present example, let ΔM20 be the amount of movement of the correction lens group LG11 (distance between reference position and correction position) that corrects the astigmatism having worsened when the temperature has increased by 20° C., and ΔM20=−0.080 mm in the wide-angle position, and ΔM20=−0.050 mm in the telescopic position. ΔM20 is determined by an experiment or a simulation in which the correction lens group LG11 is actually moved in the projection system 3C. ΔM20 has a positive value in the case where the correction lens group LG11 that moves from the reference position to a correction position moves toward the screen S. ΔM20 has a negative value in the case where the correction lens group LG11 that moves from the reference position to a correction position moves away from the screen S.

In the present example, let ΔBF be the amount of movement of the back focus position in the case where the correction lens group LG11 is moved from the reference position to a correction position, and ΔBF in the wide-angle and telescopic positions is as follows.

ΔBF0.0128(in wide-angle position)/0.0200(in telescopic position)

The temperature of the projection system 3C can be the temperature in the lens barrel 30, which holds the lenses L1 to L14. That is, the temperature detected with the temperature sensor 32 can be the temperature of the projection system 3C.

Let f1 be the focal length of the correction lens group LG11, and f1=−47.071. Let f2 be the focal length of the third lens L3, which is located in a position closest to the screen S in the fixed lens group LG12, and f2=−41.071.

The projection system 3C satisfies the following conditional expression (1), where P represents the pixel pitch in an image displayed by each of the liquid crystal panels 18, FNO represents the F number of the entire lens system, and ΔBF represents the amount of movement of the back focus position in the case where the correction lens group LG11 is moved by the amount of movement for correction of the aberration that changes when the temperature changes by 20° C. (ΔM20). The conditional expression (1) shows that the amount of movement of the back focus position ΔBF is smaller than the depth of focus of the projection system 3C when the correction lens group LG11 is moved by the amount of movement for correction of the aberration that worsens when the temperature changes by 20° C. (ΔM20=−0.080 mm in wide-angle position and ΔM20=−0.050 mm in telescopic position).

$$|\Delta BF20|<P\times FNO\times\sqrt{2} \quad (1)$$

Specifically, in the present example, P=0.010 mm. In the wide-angle position, FNO=1.50. In the telescopic position, FNO=1.98. In the wide-angle position, ΔBF=0.0128. In the telescopic position, ΔBF=0.0200. The projection system 3C therefore satisfies the conditional expression (1) as follows.

|0.0128|<0.010×1.50×√2=0.021 (In wide-angle position)

|0.0200|<0.010×1.98×√42=0.028 (In telescopic position)

The projection system 3C further satisfies the following conditional expression (2), where f represents the focal length of the entire lens system, and f1 represents the focal length of the correction lens group LG11.

$$1.5<|f1/f| \quad (2)$$

Specifically, in the present example, f=18.51 in the wide-angle position, and f=29.39 in the telescopic position. Further, f1=−47.071. The projection system 3C therefore satisfies the conditional expression (2) as follows.

1.5<|−47.071/18.51|=2.5 (In wide-angle position)

1.5<|−47.071/29.39|=1.6 (In telescopic position)

In the present example, the correction lens group LG11, which is located in a position closest to the screen S in the projection system 3C, is moved in the direction of the optical axis L to correct degradation in the optical characteristics of the projection system 3C. Worsened astigmatism is therefore readily corrected. Further, in the present example, since the relationship between the focal length f1 of the correction lens group LG11 and the focal length f of the entire lens system satisfy the conditional expression (2), astigmatism that worsens due to a temperature change is readily corrected by moving the correction lens group LG11 to the direction of the optical axis L.

Further, since the projection system 3C satisfies the conditional expression (1), the amount of movement of the back focus position ΔBF20 is smaller than or equal to the depth of focus of the projection system 3C in the case where the correction lens group LG11 is moved by the amount of movement ΔM20 for correction of the aberration that changes when the temperature changes by 20° C. In other words, since the projection system 3C satisfies the conditional expression (1), the amount of movement of the back focus position ΔBF20 in the case where the correction lens group LG11 is moved from the reference position to a correction position is small enough not to affect the quality of a projected image. In other words, defocus that occurs when the correction lens group LG11 is moved from the reference position to a correction position can be avoided. A change in the back focus position of the projection system 3C that occurs due to a temperature change can be suppressed in a design phase. Therefore, as long as the amount of movement of the back focus position ΔBF20 in the case where the correction lens group LG11 is moved is smaller than the depth of focus of the projection system 3C, it is unnecessary to provide a second correction lens group for correcting the back focus position when the correction lens group LG11 is moved. The number of lens groups to be moved in the direction of the optical axis L to correct astigmatism that worsens due to a temperature change can therefore be reduced.

In the present example, the third lens L3, which is located in a position closest to the screen S in the fixed lens group LG12, is a negative lens, and let f2 be the focal length of the third lens L3, and the following conditional expression (3) is satisfied.

$$0.1 < |f2/f1| < 0.9 \quad (3)$$

Specifically, in the present example, f1=−47.071, and f2=−41.071. The projection system 3C in the present example therefore satisfies the conditional expression (3) as follows.

$$0.1 < |-41.071/-47.071| = 0.88 < 0.9$$

In a case where |f2/f1| is greater than the upper limit or smaller than the lower limit in the conditional expression (3), the amount of distortion increases in some cases when the correction lens group LG11 is moved to correct astigmatism produced due to a temperature change. On the other hand, in the case where the focal length f2 of the third lens L3, which is a negative lens, and the focal length f1 of the correction lens group LG11 satisfy the conditional expression (3), the increase in the distortion can be suppressed. Further, when the conditional expression (3) is satisfied, an increase in field curvature can be suppressed.

Further, in the present example, let nd1 be the refractive index of the second lens L2 (correction-lens-group last lens), which is a lens of the correction lens group LG11 and located in a position closest to the fixed lens group LG12, and vd1 be the Abbe number of the second lens L2, and the following conditional expressions (4) and (5) are satisfied.

$$1.45 < nd1 < 1.60 \quad (4)$$

$$50 < vd1 < 85 \quad (5)$$

That is, in the present example, nd1=1.49700 and vd1=81.5, as shown in FIG. 14. The conditional expressions (4) and (5) are therefore satisfied in the present example. When the conditional expression (4) is satisfied, an increase in the field curvature in the case where the correction lens group LG11 is moved in the direction of the optical axis L can be suppressed. Further, When the conditional expression (5) is satisfied, an increase in chromatic aberration of magnification in the case where the correction lens group LG11 is moved in the direction of the optical axis L can be suppressed.

The projection system 3C includes the lens barrel 30, which holds the entire lens system, the temperature sensor 32, which detects the temperature in the lens barrel 30, the moving mechanism 33, which moves the correction lens group LG11 in the direction of the optical axis L, and the correction controller 34, which drives the moving mechanism 33 based on the output from the temperature sensor 32. The correction controller 34 can therefore drive the moving mechanism 33 based on the output from the temperature sensor 32 to automatically correct astigmatism that worsens due to a temperature change.

In the present example, the relationship between a change in the temperature in the lens barrel 30 (increase in temperature from reference temperature) and the position where the correction lens group LG11 is located on the optical axis L and which allows correction of astigmatism produced due to the temperature change (correction position) is determined in an experiment or a simulation. Further, the correction controller 34 of the projection system 3C stores and holds the relationship between an increase in the temperature from the reference temperature and a correction position, for example, in the form of a table. The correction controller 34 therefore refers to the storage based on an increase in the temperature from the reference temperature and drives the moving mechanism 33 based on the result of the reference to move the correction lens group LG11 to a correction position.

Further, in the present example, since the projection system 3C readily allows correction of astigmatism that worsens due to a temperature change, the quality of a projected image can be maintained even in the case where the light projected from the projector 1 has a luminous flux greater than or equal to 20 klm so that the temperature of each of the lenses L1 to L14, which form the projection system 3C, is likely to increase when an image is projected and the astigmatism is therefore likely to worsen.

The correction lens group LG11 may instead be manually moved from the reference position to a correction position.

In the example described above, the correction lens group LG11 is moved in the direction of the optical axis L when astigmatism worsens due to a temperature change. The correction lens group LG11 can also be moved in the direction of the optical axis L to correct astigmatism, for example, in a case where the astigmatism worsens when the projection magnification is changed.

The entire disclosure of Japanese Patent Application No. 2017-169219, filed on Sep. 4, 2017 is expressly incorporated by reference herein.

What is claimed is:

1. A projection system that projects an image displayed on an image display device and having a predetermined pixel pitch on a screen and has a zoom function of changing projection magnification, the projection system comprising: a first lens group that is located in a position closest to the screen in the projection system and does not move in a direction of an optical axis when the projection magnification is changed with an aid of the zoom function, wherein first lens group includes a correction lens group that is moved in the direction of the optical axis to correct a change in an aberration produced due to a temperature change and a fixed lens group that is disposed on a side opposite the screen with respect to the correction lens group and does not move in the direction of the optical axis, the correction lens group is formed of one or more lenses arranged from a side facing the screen, and a following conditional expressions (1) and (2) are satisfied:

$$|\Delta BF20| < P \times FNO \times \sqrt{2}$$

$$1.5 < |f1/f|$$

where P represents the predetermined pixel pitch in the image, FNO represents an F number of an entire lens system, f represents a focal length of the entire lens system, f1 represents a focal length of the correction lens group, and ABFABF20 represents an amount of movement of a back focus position in a case where the correction lens group is moved by an amount of movement for correction of the aberration that changes when the temperature changes by 20° C.

2. The projection system according to claim 1,
wherein a fixed-lens-group first lens located in a position closest to the screen in the fixed lens group is a negative lens, and
a following expression (3) is satisfied:

$$0.1 < |f2/f1| < 0.9 \tag{3}$$

where f2 represents a focal length of the fixed-lens-group first lens.

3. The projection system according to claim 1, wherein in a case where the correction lens group is formed of one lens, following conditional expressions (4) and (5) are satisfied:

$$1.45 < ndl < 1.90$$

$$50 < vdl < 85$$

where ndl represents a refractive index of the one lens and vdl represents an Abbe number of the one lens, and in a case where the correction lens group is formed of a plurality of lenses, the following conditional expressions (4) and (5) are satisfied: where ndl represents a refractive index of a correction-lens-group last lens, which is a lens of the correction lens group and located in a position closest to the fixed lens group, and vdl represents an Abbe number of the correction-lens-group last lens.

4. The projection system according to claim 1, further comprising:
a lens barrel that holds the entire lens system;
a temperature sensor that detects a temperature in the lens barrel;
a moving mechanism that moves the correction lens group in the direction of the optical axis; and
a correction controller that drives the moving mechanism based on an output from the temperature sensor.

5. A projection-type image display apparatus comprising:
the projection system according to claim 1; and
an image display device having the predetermined pixel pitch and disposed in a back focus position of the projection system.

6. A projection-type image display apparatus comprising:
the projection system according to claim 2; and
an image display device having the predetermined pixel pitch and disposed in a back focus position of the projection system.

7. A projection-type image display apparatus comprising:
the projection system according to claim 3; and
an image display device having the predetermined pixel pitch and disposed in a back focus position of the projection system.

8. A projection-type image display apparatus comprising:
the projection system according to claim 4; and
an image display device having the predetermined pixel pitch and disposed in a back focus position of the projection system.

9. The projection-type image display apparatus according to claim 5, wherein the projection-type image display apparatus projects light having a luminous flux greater than or equal to 20 klm.

* * * * *